D. NOBLE.
PERFORATING MACHINE.
APPLICATION FILED MAY 6, 1918.
1,376,897.
Patented May 3, 1921.
8 SHEETS—SHEET 1.
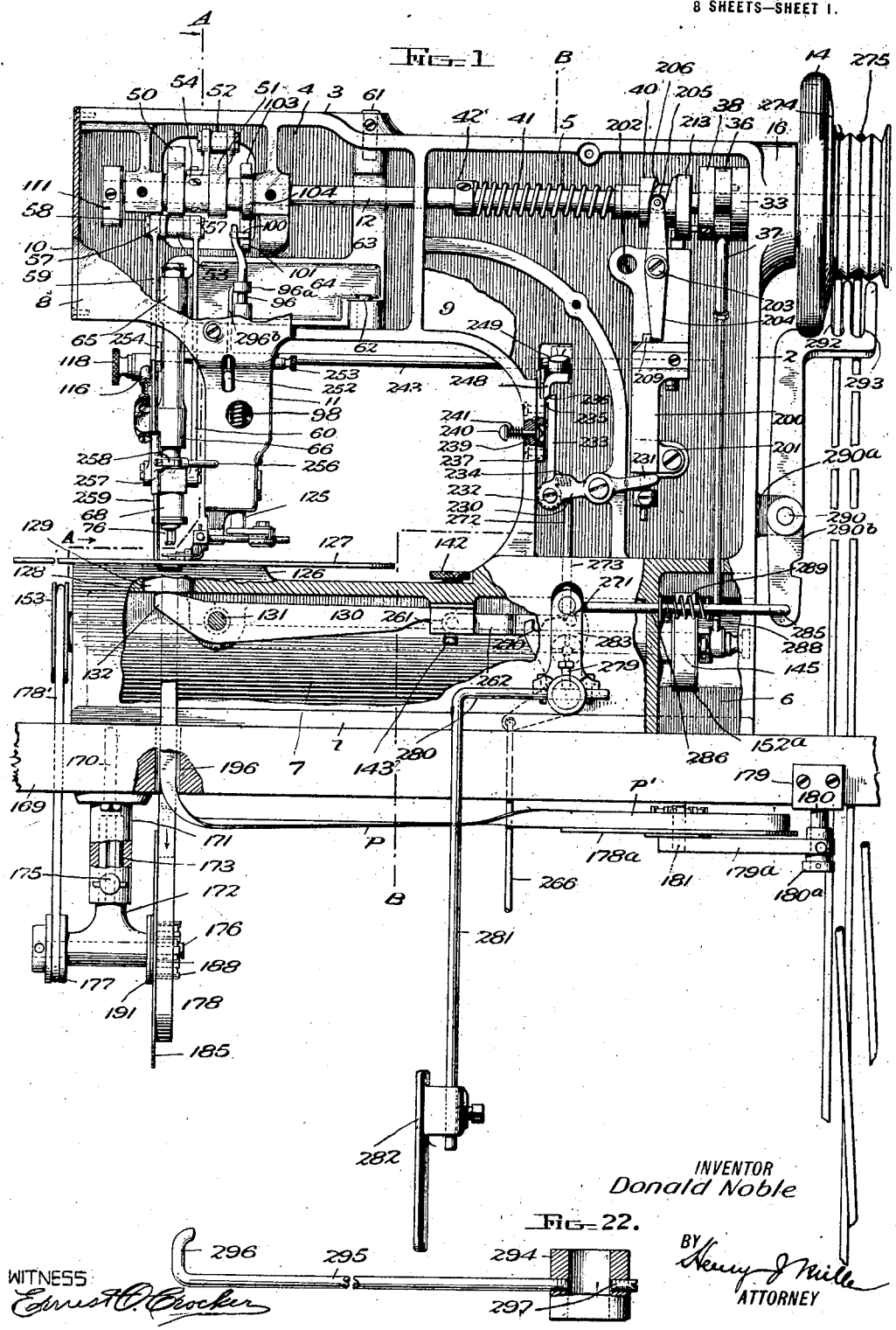
INVENTOR
Donald Noble
BY Henry J. Miller
ATTORNEY
WITNESS
Ernest O. Crocker

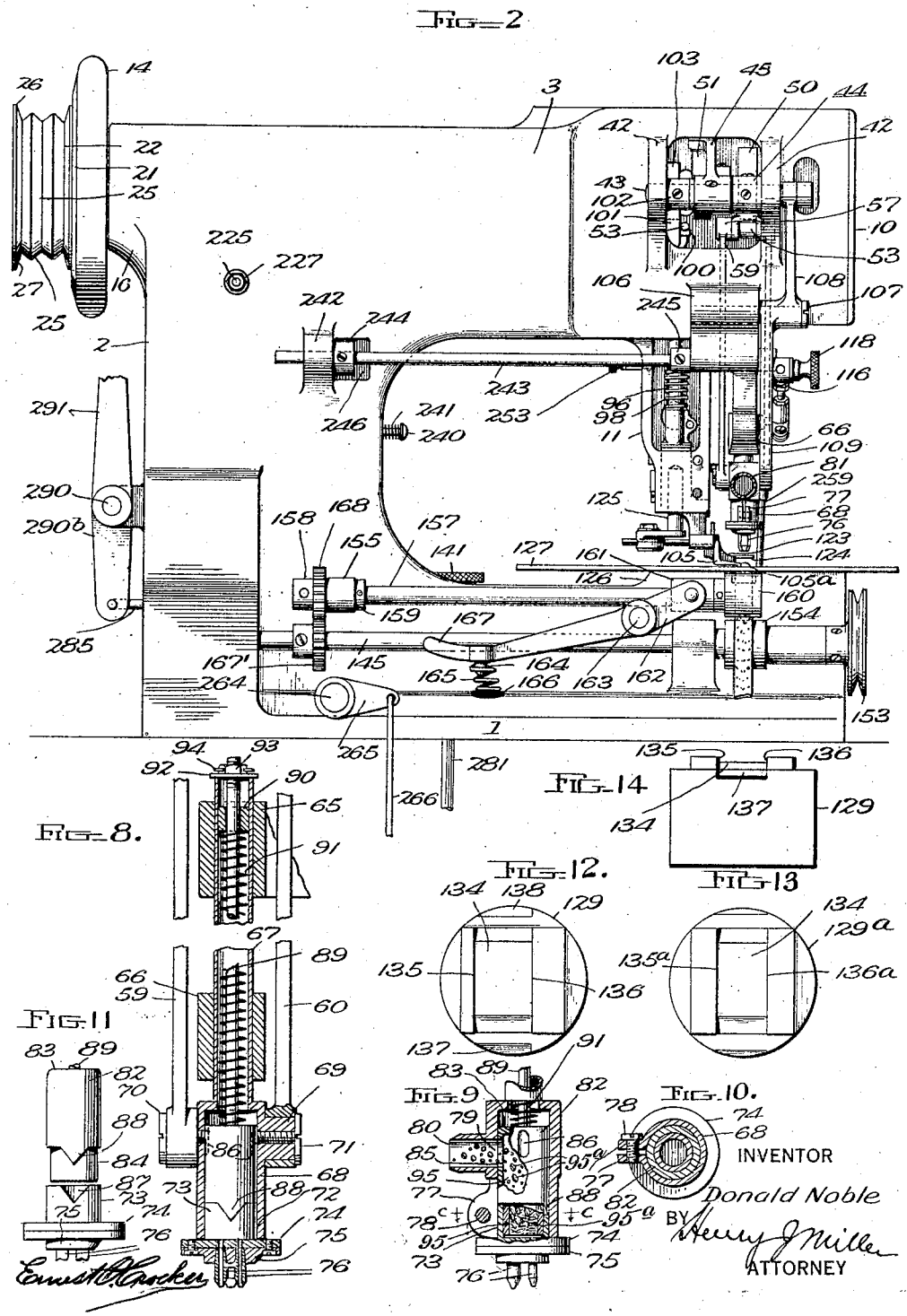
D. NOBLE.
PERFORATING MACHINE.
APPLICATION FILED MAY 6, 1918.
1,376,897.
Patented May 3, 1921.
8 SHEETS—SHEET 2.

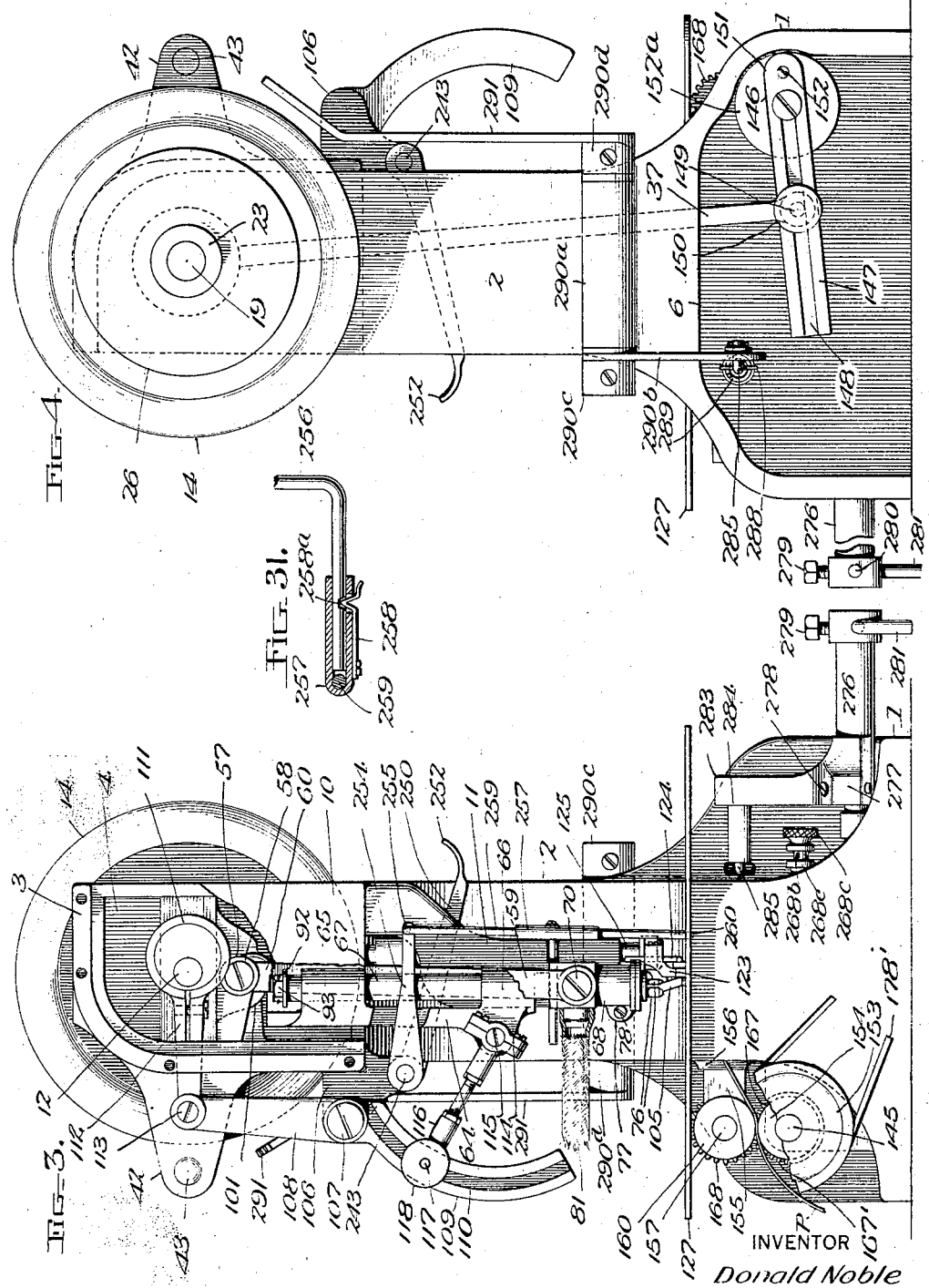

D. NOBLE.
PERFORATING MACHINE.
APPLICATION FILED MAY 6, 1918.
1,376,897.
Patented May 3, 1921.
8 SHEETS—SHEET 4.
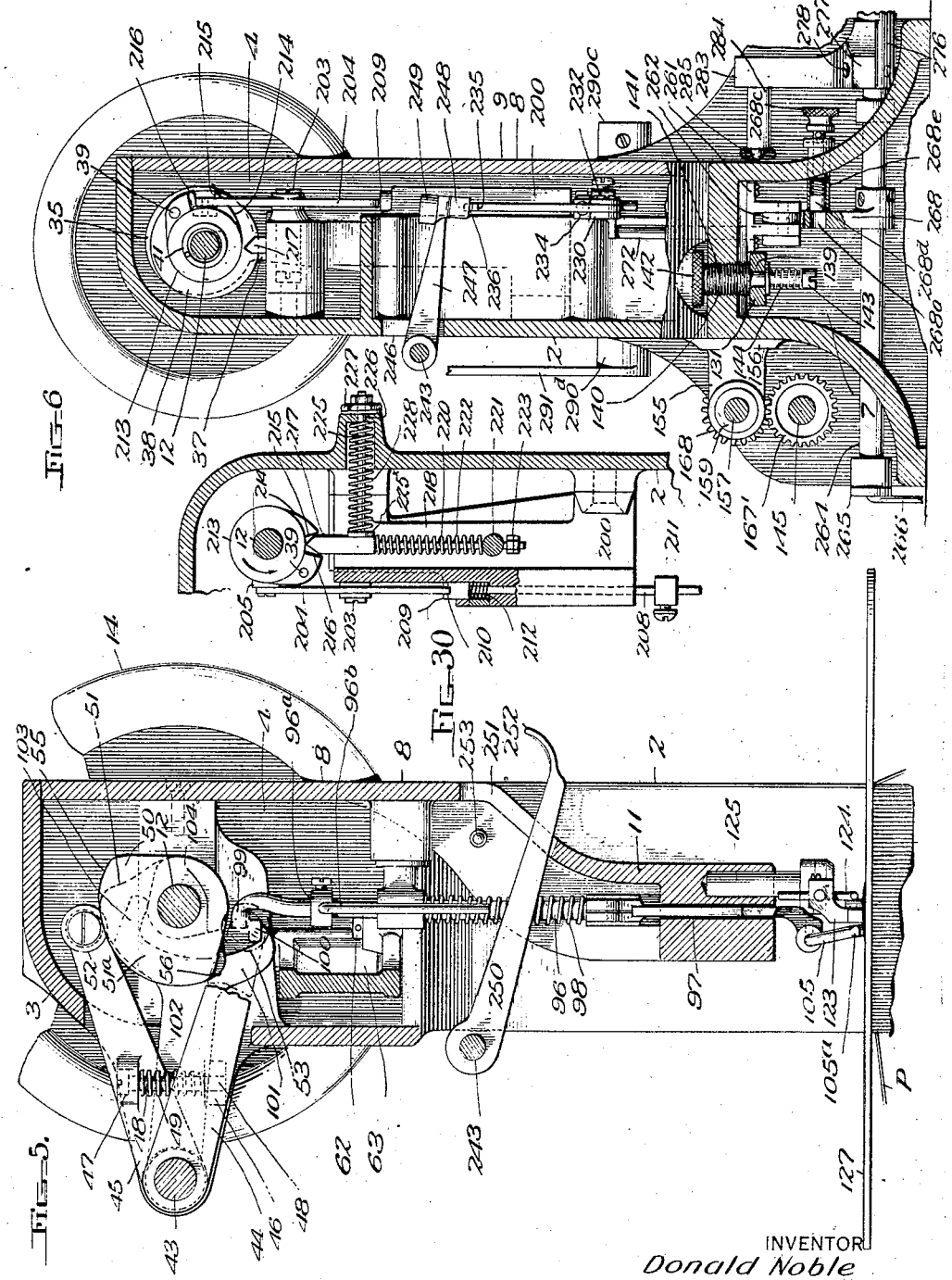
INVENTOR
Donald Noble
BY
ATTORNEY
WITNESS D. NOBLE.
PERFORATING MACHINE.
APPLICATION FILED MAY 6, 1918.
1,376,897.
Patented May 3, 1921.
8 SHEETS—SHEET 5.
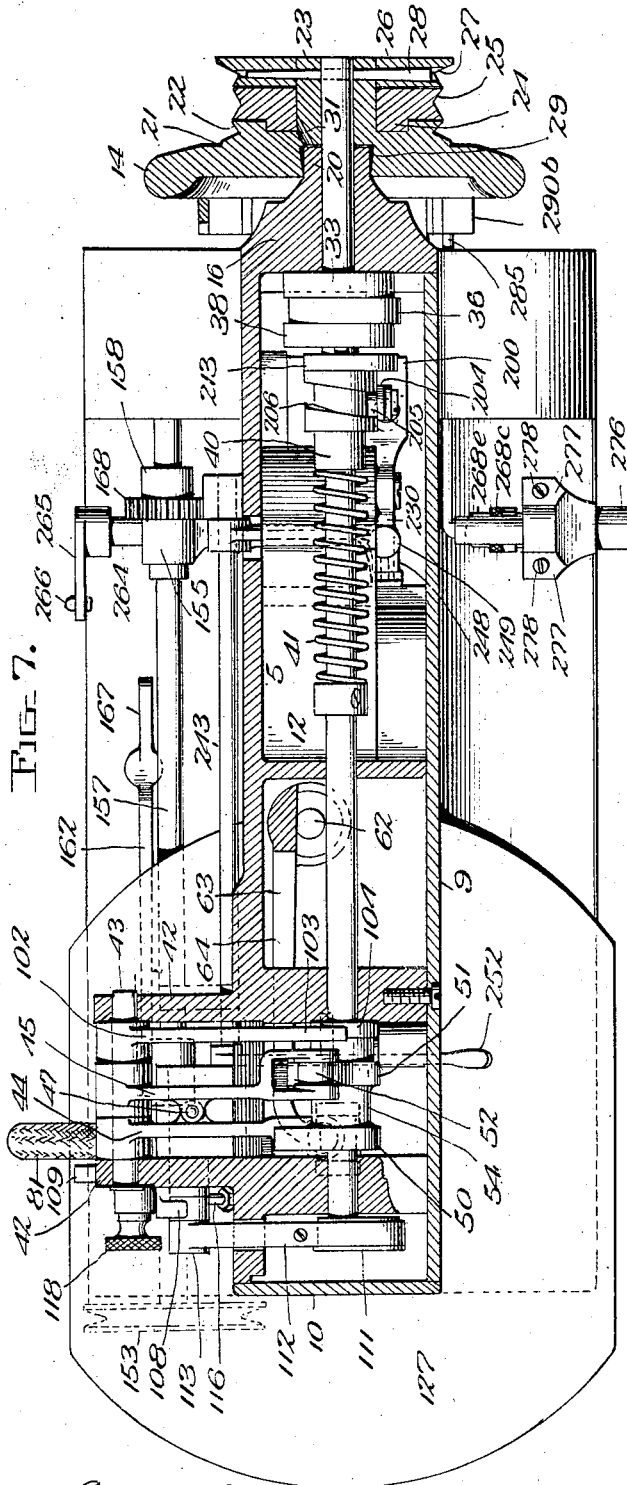
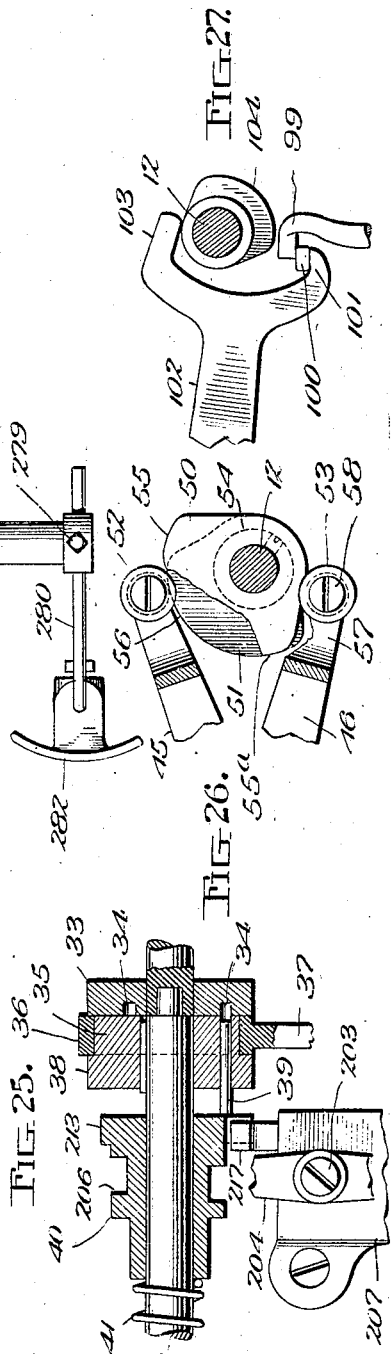
INVENTOR
Donald Noble
BY
ATTORNEY D. NOBLE.
PERFORATING MACHINE.
APPLICATION FILED MAY 6, 1918.
1,376,897.
Patented May 3, 1921.
8 SHEETS—SHEET 6
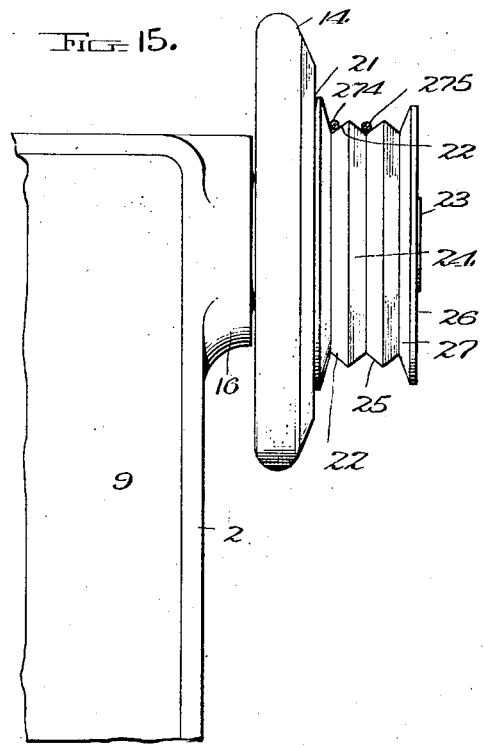
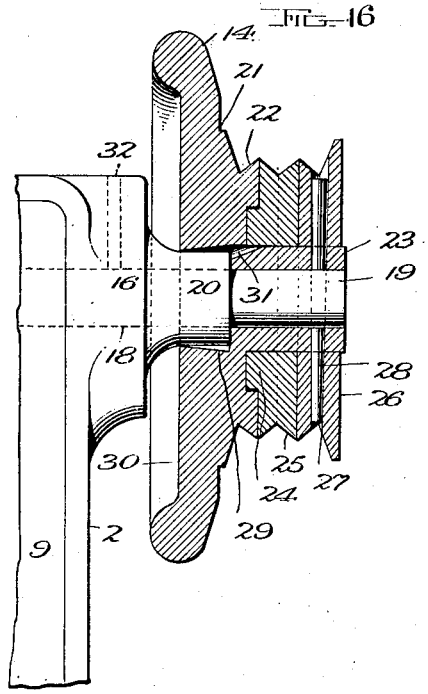
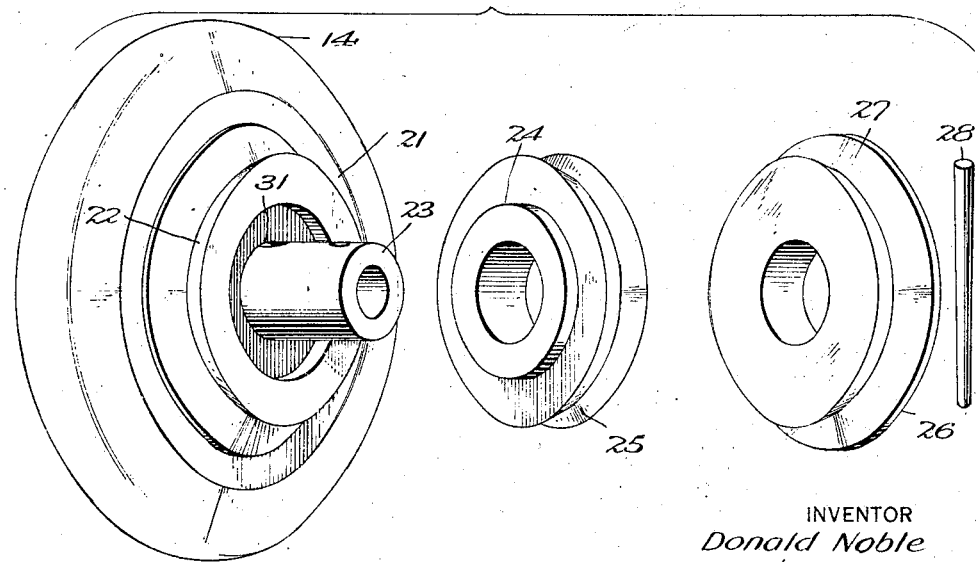
INVENTOR
Donald Noble D. NOBLE.
PERFORATING MACHINE.
APPLICATION FILED MAY 6, 1918.
1,376,897.
Patented May 3, 1921.
8 SHEETS—SHEET 7.
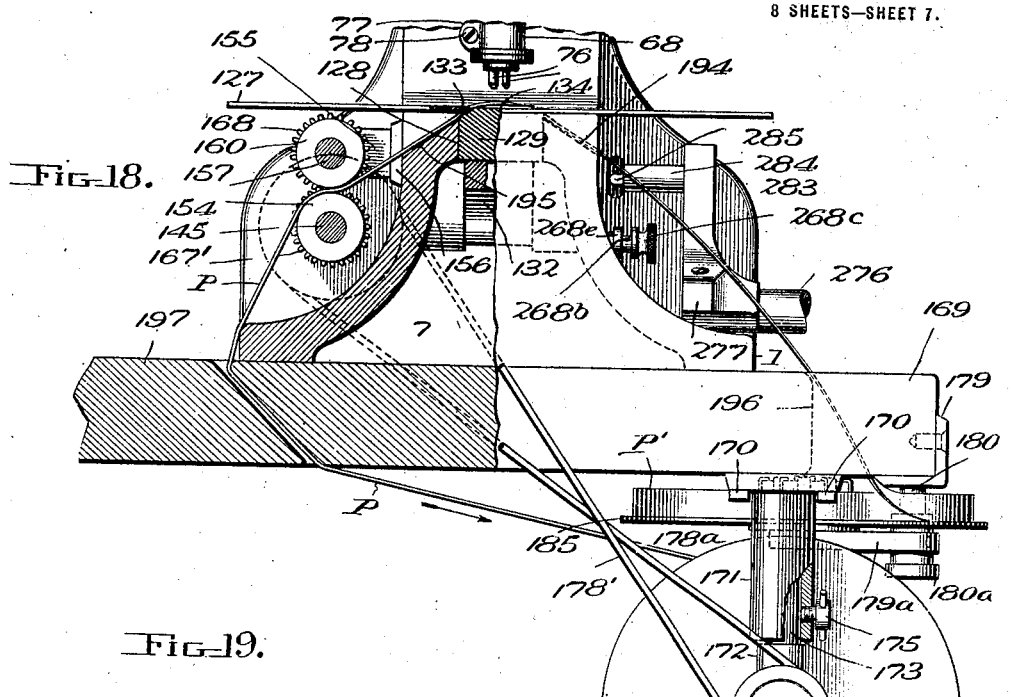
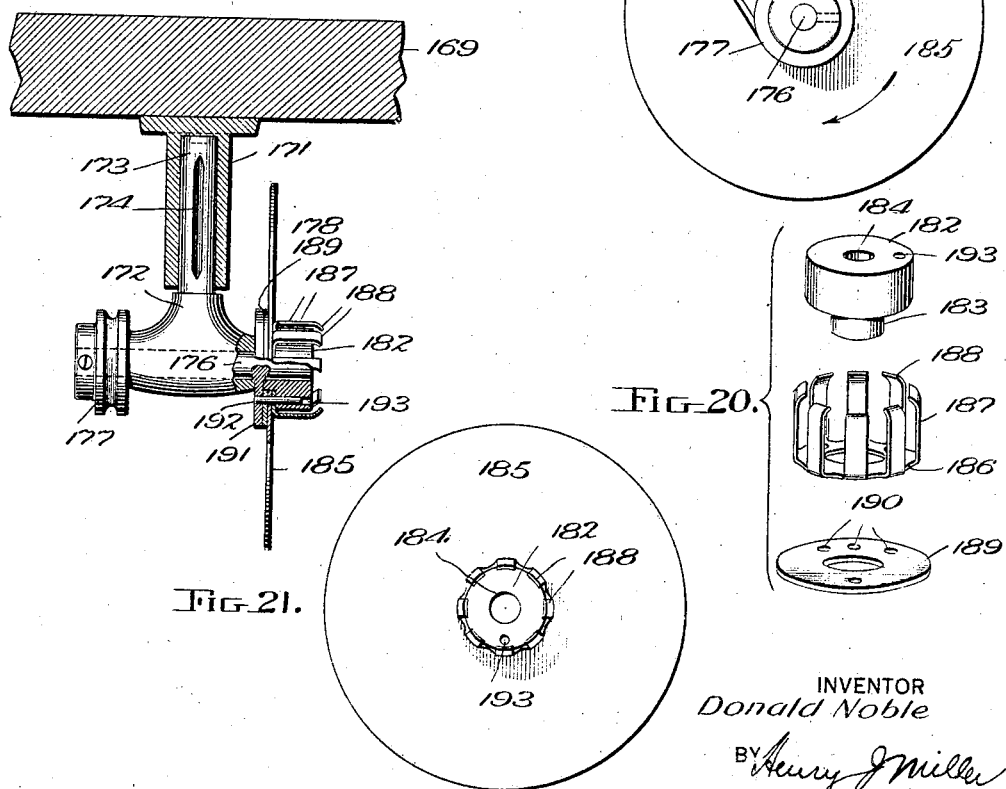
INVENTOR
Donald Noble
BY Henry J Miller
ATTORNEY

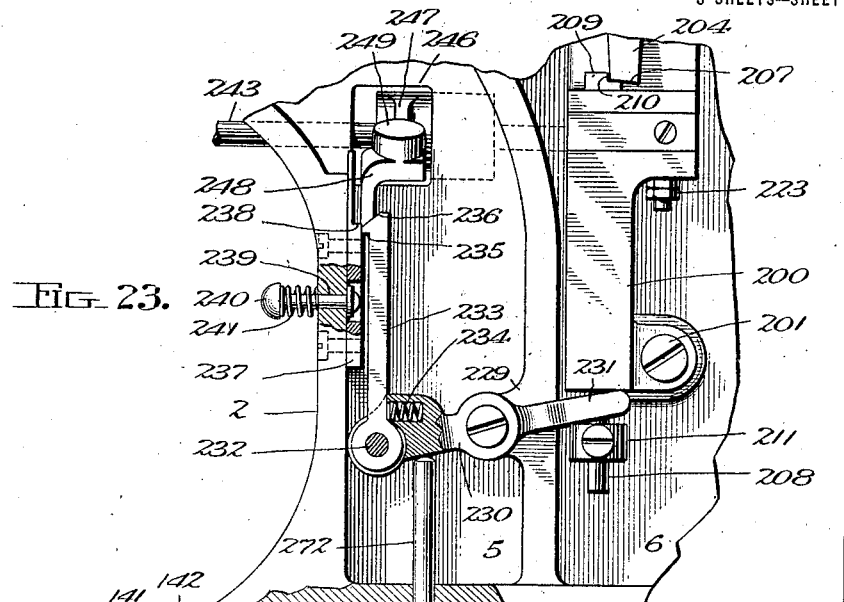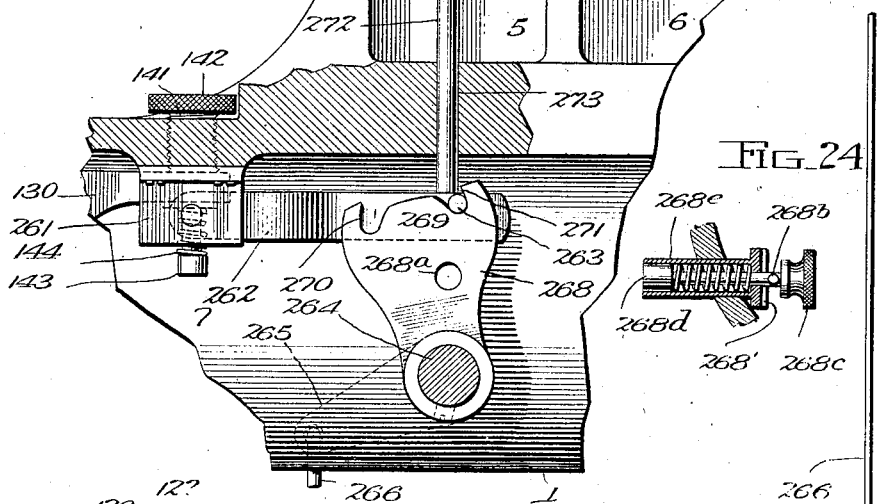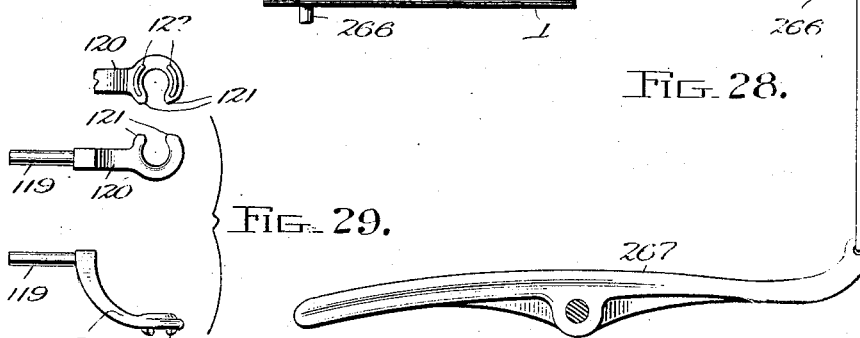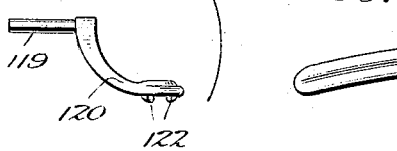

UNITED STATES PATENT OFFICE.

DONALD NOBLE, OF BRIDGEPORT, CONNECTICUT, ASSIGNOR TO THE SINGER MANUFACTURING COMPANY, OF ELIZABETH, NEW JERSEY, A CORPORATION OF NEW JERSEY.

PERFORATING-MACHINE.

1,376,897.

Specification of Letters Patent.

Patented May 3, 1921.

Application filed May 6, 1918. Serial No. 232,744.

*To all whom it may concern:*

Be it known that I, DONALD NOBLE, a subject of the King of Great Britain, residing at Bridgeport, in the county of Fairfield and State of Connecticut, have invented certain new and useful Improvements in Perforating-Machines, of which the following is a specification, reference being had therein to the accompanying drawings.

This invention relates to perforating machines and more specifically to that type of machine employed in the manufacture of shoes for producing the lines of ornamental perforations commonly formed along the edges of the pieces of leather or other material composing the shoe upper. The present machine is of that type which employs a single punch or cluster of punches acting by a succession of rapid blows to produce the row of perforations and is thus to be distinguished from that form of perforating machine in which a large number of punches or clusters of punches is employed and which forms the entire series of perforations as a single operation. While the machine as herein disclosed is particularly adapted for performing the operation above described it will be understood that the machine is not to be limited to such use and that many of the novel features of the machine disclosed are capable of use in machines of other types and of widely different character.

The invention consists in the provision of a punch operating mechanism comprising a punch-lifting and a punch-depressing cam, the latter having a part adapted to slightly relieve the punch immediately after the punching blow, the punch being actuated from the cams through a pair of relatively adjustable cam followers.

By the employment of the punch-operating devices described, the punch is positively moved in both directions and through a constant and invariable distance, the adjustable connection between the two cam followers providing for taking up of backlash due to wear, thus insuring a uniform cutting action of the punch regardless of the speed at which it is driven, thereby avoiding many of the defects inherent to machines in use at the present time.

The invention further consists in novel means for supporting the punch and for reciprocating the same in the direction of the line of perforations being formed, the punch being moved while still engaged with the work thereby serving to feed the same to position for the next perforating operation. Provision is also made for varying the feeding stroke of the punch, the punch, however, in its rearward or feeding movement always stopping at the same point regardless of the length of stroke. The punch furthermore is so guided that its axis is at all times perpendicular to the work, insuring a perfect and clean cutting operation.

In machines of this type in which hollow punches of very small diameter are employed, difficulty has been experienced by reason of the jamming of the punchings or chips in the punch shank or holder therefor. As the chips, during the moment of cutting are compressed to a considerable degree, it follows by reason of the spongy or elastic character of the material that the chips when relieved of the cutting pressure will expand and in so doing tend to clog or jam any receptacle into which they may pass, especially if the latter be narrow or of restricted capacity. Such jamming of the chips within the hollow punch frequently results in bursting the punch, necessitating replacement of the same, causing delay to the operator and increasing the cost of upkeep of the machine.

The present invention therefore further consists in the provision of means for agitating the punchings or chips as they pass up into the hollow punch carrier to prevent jamming of the same therein, such means comprising the employment of a tubular punch carrier and a hollow piston-like chip agitator slidable therein with means for causing the punch carrier to slide relatively to the chip agitator during the final portion of the punching stroke, thereby enlarging the chip receiving space just at the moment of punching, and at the same time causing a thorough agitation of the chips already therein,—a flexible conduit leading from the receiver to convey away the chips as they accumulate therein.

The invention consists further in the provision of a bed punch or anvil for supporting the work against the blow of the punch, such bed punch being adjustable toward and from the punch by a fine or micrometer adjustment whereby to compensate for variation in the thickness of the paper strip employed to receive the blows of the punch, as well as for differences in the length of the punches employed and also for the slight spring of the supporting frame sometimes occurring when running at high speed and upon hard material.

The machine as herein disclosed is of that type in which a strip of flexible material such as paper is interposed between the bed plate and the work to insure the passage of the punch through the full thickness of the work to produce a clean cut, and at the same time to avoid dulling of the cutting tool. The present invention therefore further comprises the provision of means for supporting a supply of paper in the form of a roll, for guiding the same over the bed plate, for positively feeding the same independently of the punch mechanism and for rewinding the strip as fast as used.

As it is desirable to vary the speed of travel of the strip over the bed plate at times, as when employing different styles of punch, for example, a variable speed drive for the paper feed is provided. In order that the paper strip may be reversed so that the opposite edges thereof may be utilized, the supporting means for the supply and used portions of the paper are made to be readily interchangeable and that both the middle and edge portions of the strip may be employed, the bed plate is made interchangeable, plates being provided having strip guiding means located either centrally or at one side thereof.

The invention further comprises a resiliently actuated presser foot adapted to hold the work against the work support during the punching operation, but which is positively lifted to release the work during feeding. While the present invention contemplates the employment, under some circumstances, of a presser-foot of ordinary type a presser foot of novel construction is herein provided, said presser foot having opposed arms extending upon opposite sides of the path of feed movement of the punch, but contacting with the work only adjacent the rearward limit of movement of the punch, the contact element thereof being of such form as to permit ready turning of the material in its own plane about said element as a center.

The invention further contemplates the provision of means for driving the machine at two widely different speeds, said means comprising the employment of a pair of pulleys fixed to the drive shaft and having a loose pulley interposed therebetween, a pair of driving bands or belts moving at different speeds being adapted for engagement with the respective fixed pulleys, finger and knee operated devices being provided for simultaneously shifting said belts.

In the mounting and supporting of the driving pulleys, a novel and desirable lubricating arrangement has been incorporated.

The invention further consists in the provision of driving and stop mechanism comprising a clutch and stop device of the general form shown in patent to Cornely, 852,598, May 7, 1907. In the present disclosure such clutch device has been modified in various particulars among which is the provision of a resiliently supported stop bolt serving to prevent breakage of parts under certain conditions of starting.

The invention consists further in the provision of a stop motion device operable either at the will of the operator as by means of a treadle, or which may be placed under control of a feeler resting upon the work and adapted to stop the machine when the line of perforations has reached a predetermined distance from the edge thereof, such feeler being in the form of an attachment readily fixable in operative position.

The invention further comprises a stop motion which when under control of the operator may operate to stop the machine after each successive operation or which may stop the machine only when positively actuated by the operator.

The invention further consists in the provision of locking means for the drive mechanism whereby any accidental movement of the operative parts may be prevented, as for example when it is desired to change or adjust the punches, thus avoiding possible breakage of the machine or injury to the operator.

Other and further desirable features of the machine together with improved details of construction and improved combinations of parts will be hereinafter more fully described and claimed, reference being had to the accompanying drawings for a complete disclosure of the same and in which,—

Figure 1 is a front elevation of the machine together with associated parts, the front plates of the machine being broken away to show the interior construction, parts of the main frame also being broken away for the same purpose, Fig. 2 is an elevation from the rear of the machine, Fig. 3 is an end elevation from the left hand side of Fig. 1, parts being broken away to illustrate details of the interior construction, Fig. 4 is an end elevation from the right of Fig. 1, Fig. 5 is a vertical cross-section to enlarged scale, on the line A—A of Fig. 1 showing details of the punch operating mechanism, Fig. 6 is a vertical cross-section on the line B—B of Fig. 1, Fig. 7 is a horizontal section taken through the axis of the drive shaft and illustrating details of the punch-driving and stopping mechanisms, Fig. 8 is a vertical section through the punch carrier and associated parts illustrating structural details, Fig. 9 is a vertical section through the punch carrier taken at right angles to Fig. 8, showing further details of the punch carrier, Fig. 10 is a horizontal section on line C—C of Fig. 9, Fig. 11 is a front elevational detail view showing the punch holder and chip agitator in disassembled relation, Figs. 12 and 14 are plan views illustrating, respectively, two forms of punch bed or anvil employed in the machine, Fig. 13 is a front elevation of one of said anvils, Fig. 15 is a front elevation, to an enlarged scale, of the upper, right hand end of the machine showing the arrangement of the drive pulleys, Fig. 16 is a vertical sectional view through parts shown in Fig. 15, Fig. 17 is a detail view of the drive pulley structure showing the parts in disassembled relation, Fig. 18 is a detail view from the left hand end of the machine, parts being broken away, illustrating the path of travel of the paper strip employed in the machine for receiving the blows of the punch, Figs. 19, 20 and 21 are detail views illustrating the mode of construction of the reel for supporting the paper strip, Fig. 22 is a plan view partly in section, of a modified form of belt-shifting controller sometimes employed, Fig. 23 is a detail view in front elevation and to large scale, illustrating portions of the stop motion mechanism, unrelated parts being broken away, Fig. 24 is a detail sectional view of a safety device employed, Fig. 25 is a sectional detail view of the drive clutch and related parts, Fig. 26 is an elevation, partly in section, showing details of the punch-operating cams, Fig. 27 is a detail elevation of the presser foot operating cam and coöperating parts, Fig. 28 is a side elevation of a foot treadle suitable for use with the machine, Fig. 29 is a detail of a preferred form of presser foot, showing the same in several positions, Fig. 30 is a side elevation, partly in section, of certain parts shown in Figs. 23 and 25, Fig. 31 is a detail of the feeler finger supporting-bracket.

*Frame and drive mechanism.*

1 indicates the base member of the machine, having rising therefrom at its right hand end a column or post 2, carrying an overhanging arm 3. While as herein shown the base member, post and arm are integral, it is within the scope of the invention to form these as separate members attaching the same together in any suitable manner. The base member, post and arm are provided with a series of cavities 4, 5, 6 and 7, wherein the greater portion of the operating mechanism of the machine is inclosed, the cavities 4 and 5 being provided with removable cover plates 8, 9 and 10 which may be secured in place by any suitable means. The cover plate 8 is provided, as shown at 11, with a depending bracket member serving as a support for certain portions of the mechanism to be hereinafter described. 12 is the main shaft of the machine, said shaft being provided with suitable devices for imparting the desired motion to the various operative elements of the machine, and which will be hereinafter described.

At the upper portion of the post 2, and in alinement with the axis of the shaft 12, is formed a boss 16 (Figs. 7 and 16), such boss having a journal opening 18 forming a bearing for a drive shaft 19. The outer end of the boss 16 is formed of reduced diameter, as shown at 20, for a purpose to be described. 21 is a drive pulley provided with a hand wheel 14 of usual form, said pulley having projecting from one face thereof a hub member 23, arranged to be mounted upon shaft 19. As herein shown, (Fig. 16) a pulley 24 is mounted upon the hub 23 adjacent the face of the pulley 21, and a third pulley 26 is also mounted on the hub 23 and adjacent the outer face of the pulley 24, pulleys 21, 24 and 26 being provided with belt grooves 22, 25 and 27, respectively. 28 is a cotter pin adapted to be driven through suitable alined openings in pulley 26, hub 23 and shaft 19 whereby to secure the several parts in proper position. From this construction, it will be seen that pulleys 21 and 26 are fixed upon shaft 19, while the intermediate pulley 24 is free to turn on the hub 23.

In the face of the pulley 21 opposite to that from which hub 23 projects is formed an opening or chamber 29, the diameter of which increases inwardly from the outer face 30 of the pulley, said chamber serving for the reception of the reduced extremity 20 of boss 16. Extending from the inner wall of said chamber 29 is a channel or passage 31 leading to the opposite face of the pulley and to the bearing surface of the hub 23 upon which turns the pulley 24. 32 is an oil hole formed through the upper portion of the post 2 and the boss 16, and serving to convey oil to the journal bearing of shaft 19.

In drive mechanisms, as commonly constructed wherein a pair of fast pulleys with an intermediate loose pulley are employed, difficulty has been experienced in properly lubricating the loose pulley. In the present construction this difficulty has been overcome, by reason of the fact that lubricant, passing down through the opening 32 into contact with the journal opening in boss 16 will follow along said boss until it reaches the end of the same, whereupon the rotation of shaft 19 tends to cause said lubricant to move outwardly under centrifugal action and into contact with the interior surface of chamber 29. As such chamber is of increasing diameter inwardly, centrifugal action prevents such lubricant from traveling toward the face 30 of the pulley, but urges it to move along the passage 31 into contact with the bearing of pulley 24, whereby such pulley is constantly and thoroughly lubricated.

On the inner extremity of the drive shaft 19 (see Fig. 25), and within the cavity 5 of post 2 is fixed a collar 33, said collar being provided with a pair of diametrically opposed openings 34. The right hand extremity of shaft 12, which is in alinement with drive shaft 19, reaches to a point closely adjacent the inner extremity of the latter shaft and has fixed thereon an eccentric 35 provided with an eccentric strap 36 and connecting rod 37, the purpose of which will be hereinafter described. The shaft 12 has also fixed thereon, and closely adjacent the eccentric 35, a collar 38, which collar may be integral with eccentric 35, said collar and eccentric being provided with alined openings located at the same radial distance from the axis of shaft 12 as are the openings 34. Mounted upon the shaft 12 and adjacent the collar 38 is a cam sleeve 40 freely slidable upon the shaft and provided with a pin 39 slidably guided within the openings in collar 38 and eccentric 35, and adapted to engage with either of openings 34 of collar 33, said pin thus serving as a clutch element whereby the drive shaft 19 may be connected to the shaft 12 for driving engagement therewith. Surrounding the shaft 12 is a spring 41, one end of which engages with the sleeve 40, the other being in engagement with a collar 42 fixed upon the shaft, said spring tending constantly to project the pin 39 into operative driving engagement with the opening 34.

The drive mechanism *per se* is not claimed in this application, being subject matter of applicant's divisional application Ser. No. 276,608, filed February 12, 1919.

*Punch operating mechanism.*

Projecting from the rear face of the overhanging arm 3 at the left hand end thereof, as seen in Fig. 1, are a pair of brackets 42, said brackets serving to support a stub shaft 43 fixed in suitable openings therein, and arranged with its axis parallel to the axis of shaft 12. Mounted to turn freely upon said stub shaft is a lever device comprising an arm 44 and a secondary arm 45, these arms being provided, respectively, with lugs 46, 47 (see Fig. 5) arranged in overlapping relation. Passing freely through the lug 47 is a bolt 48 screw threaded for engagement with a threaded opening in the other lug, and interposed between said lugs is a stiff spring 49 tending to separate said lugs. By adjustment of the bolt 48 the angular relation of the arms 44 and 45 may be changed.

Fixed upon the shaft 12 and in the planes of the respective arms 44 and 45 is a pair of cams 50 and 51, said cams being adapted to engage a pair of rolls 52, 53 carried by the respective arms 45 and 44. As herein shown, the cams 50 and 51 are formed integrally with a sleeve 54, the latter being fixed to the shaft in any suitable manner. As will be noted from inspection of Fig. 26, the high or active portions 55 and 56 of said cams are located upon the same side of shaft 12, but by reason of the fact that the rolls 52 and 53 are located upon diametrically opposite sides of the shaft 12, the rotation of said cams will cause an alternate rising and falling motion to be imparted to the lever member 44, the movement of the arm 45 being transmitted to the arm 44 through the bolt 48. While it is within the scope of the present invention to form the arms 44 and 45 as an integral member, if desired, it has been found preferable to form these members as separate elements with means for adjusting the same relatively to one another, whereby to take up backlash due to wear of the cam faces and the rolls engaging the same.

The employment of a pair of independent, complemental, open or non-positive cams such as 50, 51, is regarded as particularly advantageous in facilitating manufacture, the cutting of a positive cam groove being a slow and comparatively difficult process. Moreover, by the use of such complemental open cams with relatively adjustable cam followers it is possible at all times to overcome backlash with its accompanying noise and vibration, a matter very difficult to accomplish when a positive cam is employed, wherein wear of the cam or its follower immediately results in objectionable noise and inaccuracy in operation.

The lever 44 is bifurcated at its forward extremity to form a pair of opposed arms 57 between which is located the roll 53, said roll being pivoted to turn upon a pin 58, passing through suitable alined openings in the arms 57, the ends of the pin 58 projecting beyond the outer faces of the arms 57 and having pivotally mounted thereon the upper extremities of a pair of links 59 and 60, said links being retained upon the ends of said pin 58 by any suitable means. Fixed in the upper and lower walls respectively of the chamber 4 of arm 3 are opposed pins 61, 62 providing pivotal bearings for a swinging bracket 63 having a horizontal arm 64 serving as a supporting means for the punch carrier. The arm 64 is provided with upper and lower alined bearing members 65, 66, in which is mounted for vertical sliding movement the tubular punch carrier 67.

*Punch carrier and chip agitator.*

As will be seen from inspection of Fig. 8 the punch carrier 67 comprises an upper portion of cylindrical tubular form of relatively small diameter and a lower tubular portion 68 of greater diameter, the interior of which forms a receiver 95 for the punchings or chips 95ª cut by the punch. The enlarged lower portion of said punch carrier is provided at 69 with a pair of opposed bearing bosses, of which only one is shown, said bearing bosses being pivotally supported in the lower ends of links 59, 60. Screws 70, 71, having enlarged heads, are engaged with threaded openings in the bosses 69 and serve to hold the links 59, 60 in proper position thereupon. The lower extremity of the punch carrier is open as at 72, and serves for the reception of a sleeve 73 forming a portion of a punch holder 74, said punch holder as herein shown serving to support a plate 75, having therein a plurality of hollow punches 76, the exact construction of these latter parts, however, being of no importance so far as the present invention is concerned.

The punch carrier is split at its lower extremity at the rear portion thereof, and is provided with a pair of outstanding ears 77 through which is passed a bolt or screw 78, by means of which said ears may be drawn together, thus serving to clamp the sleeve 73 of the punch holder within the extremity of the punch carrier. 79 indicates an opening or passage-way leading from the interior of the lower portion 68 of the punch carrier, such passage-way serving to permit the discharge of chips cut by the hollow punches and which pass up into said lower extremity of the punch carrier. As herein shown the punch carrier is provided at 80 with an outwardly extending nipple to which may be connected, as shown at 81, a flexible conductor for leading chips away from the machine and to any suitable receiver.

As in machines as heretofore constructed, and in which hollow punches were employed, a great deal of annoyance has been caused by reason of the jamming or clogging, within the cavity of the punch carrier, of chips cut by the punches, the following mechanism has been devised whereby such clogging of the chips is avoided. Located within the chip-receiving cavity 95, of part 68, is a hollow cylindrical piston-like device 82 constituting a chip agitator, such device being provided with a closed upper end or head 83, serving to adjustably limit the capacity of said cavity for receiving chips discharged upwardly thereinto from the punches. The chip agitator is formed with a portion 84 of reduced diameter, the main body of said chip agitator 82 being of substantially the internal diameter of the lower portion 68 of the carrier, while the reduced portion 84 thereof fits within and slidably engages the sleeve 73 of the punch holder 74. The chip agitator is provided in its side wall with a chip discharge opening 85, this opening being adapted to register with the opening 79 in the carrier 68. In order that the opening 85 in the chip agitator may properly register with the opening 79, a pair of opposed slots 86 are provided upon diametrically opposite sides of said chip agitator, said slots being adapted for engagement by the extremities of the screws 70, 71, which project inwardly beyond the walls of the carrier 68 for this purpose, thereby preventing any turning movement of the chip agitator.

In employing punch holders provided with a cluster of punches, it is desirable that such punch clusters, when placed in position, shall be arranged symmetrically of the line of the feed of work and some difficulty has been experienced in properly centering the same when introducing the punch holder into the lower extremity of the punch carrier. As a means for facilitating the proper centering of the punch holder when placing the same in operative position with relation to the carrier, the sleeve 73 of the punch holder has been provided as herein shown with a centrally disposed V shaped notch 87. In the upper edge of the chip agitator 82 is provided a corresponding V shaped lug 88, projecting downwardly from the shoulder formed at the junction of the part 84 of reduced diameter with the main portion of said chip agitator, such lug being located in a plane central of said chip agitator and passing through the line of feed of the work. By this construction, it will be seen that it is only necessary to introduce the punch holder into the lower extremity of the punch carrier, and to turn the same until said lug 88 registers with the notch 87, whereupon the screw 78 may be tightened to properly clamp the punch holder in operative position.

Extending upwardly from the closed head 83 of chip agitator 82 is a rod 89, which may be fixed to said chip agitator in any desired manner as by means of screw threaded engagement with the same, this rod passing up through the tubular portion of the punch carrier 67 and projecting to a slight distance above the upper extremity of the same, the carrier being provided at the point 90 with a guide bushing having an opening for guiding the upper end of said rod 89. Between the bushing 90 and the head 83 of the chip agitator is a spring 91 surrounding the rod 89, said spring, by bearing at its opposite extremities upon said bushing 90 and the head 83, tending to cause the chip agitator 82 to move downwardly within the chamber in the lower extremity of the punch carrier, and to hold the same with the lug 88 closely seated in the notch 87. Surrounding the upper extremity of the rod 89 is a washer 92 which overlaps the edges of the upper extremity of the tubular carrier 67, said washer being retained in place upon the end of rod 89 by means of a nut 93 which may be locked in adjusted position as by means of a pin 94, or other suitable device. As will be noted, the washer 92 is of a greater diameter than the carrier 67, and projects beyond the side walls of the same, thus overlapping the guide opening in the bearing member 65.

Consideration of the above mechanism will show that upon downward movement of the punch carrier 67, the chip agitator 82, being held down by the spring 91, will move downwardly with the punch carrier until the washer 92 strikes the upper surface of the bearing member 65. Upon further downward movement of the punch carrier, the rod 91 will be restrained from movement and the chip agitator 82 will thereby be prevented from further movement with the punch carrier, thus causing the lug 88 to separate, to a certain extent, from the notch 87. In the normal position of the parts with the lug 88 engaging closely in the notch 87, the capacity of chamber or receptacle 95 in the lower portion 68 of the carrier and into which the chips are discharged from the hollow punches is at a minimum, but it will be noted that upon separation of the lug 88 from the notch 87 in the downward travel of the punch carrier in the manner above indicated, the capacity of this chip-receiving chamber will be increased, chip agitator 82 sliding upwardly relatively to the inner surface of carrier 68. As the punch descends to perform the punching operation, the chip agitator 82, as above indicated remains in close contact with the sleeve portion 73 during the first portion of the movement but at the instant of punching and at which time the chips previously contained within the hollow punches are being discharged into the chip-receiving chamber of the punch carrier, such chamber or receptacle is enlarged by the separation of the head of the chip agitator and the punch holder, as above described, thus insuring additional space for the entrance of the new chips.

In the usual forms of punch carrier there is a tendency, due to the expansion of the chips, to cause a jamming against the side walls of the receptacle which prevents entrance of further chips, and under such circumstances the punch tubes are frequently broken. In the present arrangement, as the receptacle is enlarged at the entrance of the new chip, the new chip has time to expand and adapt itself to the space within the receptacle before the capacity of the receptacle is again decreased upon the rising movement of the punch. Moreover, the reciprocatory movement of the sleeve portion 84 of the chip agitator 82 within the sleeve 73 of the punch holder 74 serves to constantly agitate the chips already within the receptacle and tends to cause a free discharge of the same through the openings 85 and 79 into the discharge tube 81, thus preventing any clogging or jamming of the chips within the receptacle in the punch carrier, and avoiding the difficulties commonly experienced in previous constructions.

The operative movement of the punch, as will be clear from the previously described mechanism, is produced by engagement of the rolls 52 and 53 with the cam surfaces 55 and 56, respectively, the punching movement of the punch being produced through the direct engagement of the cam 50 with the roll 53, the pivotal bearing of which is formed by the pin 58, the latter being pivotally connected to the links 59 and 60,—the downward movement of said links through their connection to the bosses 69 serving to cause a positive downward movement of the punch carrier within the guides 65 and 66. As the lever arm 45 is positively connected to the lever arm 44 through the bolt 48 it is evident that the action of the cam 51 through the roll 52 will positively lift the punch carrier for removing the same from the work, the punch thus being positively moved both in its punching and retracting movements. In machines as heretofore constructed, it has been commonly the practice to produce either the punching or retracting movement through resilient means, but in machines intended to be driven at high speed it is found that the action of such resilient means cannot be relied upon and the above mechanism has therefore been devised whereby the entire action of the punch is made positive and dependable regardless of any variations in speed of the drive shaft.

By reason of the mounting of the bracket member 63 to turn about a vertical axis, it is clear that the punch carrier which is guided within the outer extremity of the horizontal portion 64 of said bracket 63, will have its axis vertical at all times, thus insuring that the cutting edges of the punches shall, in all positions of the feeding movement, lie in a plane parallel to the surface 134 of the anvil which receives the blow of the punch. This is a very desirable feature as the punch in descending upon the work will bring all points of its cutting edge simultaneously into engagement with the work, thus producing a clean and accurate cutting action. This feature is especially desirable where using a punch holder carrying a large number, or cluster, of punches, for if some of such punches are permitted to enter the work first and to strike the anvil member before the others, the result is that some of said punches may cut entirely through the work and paper strip while others thereof may fail to completely remove the chip from the work, a defect which is found to be common in machines in which the axis of the punch carrier, during its feeding movement, is at times inclined to the vertical.

Punch feed.

Projecting outwardly from the rear face of the arm 3 is a bracket 106. Pivoted to turn upon a stud 107, fixed within the bracket 106, is a lever 108, said lever being provided below the stud 107 with a curved portion 109, having formed therein a T slot 110. Upon the left hand extremity of the shaft 12 (as seen in Fig. 1) is fixed an eccentric 111, said eccentric being provided with an eccentric strap and connecting rod 112 having pivotal connection at 113 with the upper extremity of the lever 108,—rotation of the shaft 12 thus serving through eccentric 111 to rock lever 108 about the stud 107. At the point 114, in bracket arm 64 and closely adjacent the lower bearing member 66 is formed a lug having mounted therein a stud 115, such stud serving as the pivotal connection for an adjustable rod 116, the opposite extremity of which is pivotally connected to a bolt 117, the head of which has sliding engagement with the T slot 110 formed in the lower portion of the lever 108. 118 is a locking nut, by means of which said bolt 117, may be adjustably positioned within the slot 110.

From the above construction, it will be evident that upon swinging of the lever 108 the bracket 64 together with the punch carrier and punch will be swung upon the pivot points of said bracket 63 as a center, the axis of the punch always lying in a vertical plane. The above movement of the punches about the vertical axis of the bracket 63 serves as a means for feeding the work, the cam 50, immediately following the extreme high portion 55 thereof, which serves to depress the punch being provided with a concentric surface 55$^a$ of lesser height which latter surface serves to slightly relieve the punch after the latter has reached its extreme downward position, thus permitting the punch to move over the punch anvil freely while still in engagement with the work, thereby feeding the work along.

As it is desirable that the punch always occupy the same position at the end of the feeding movement, this being the point about which the work is turned as a center in producing curved lines of perforations, and as it is also desirable that the feeding stroke of the punch may be varied, the curvature of the slot 110 has been struck about the stud 115 as a center while the punch occupies its extreme rearward position of feeding movement. Changes in the position of the bolt 117 within the slot thus fail to change in any respect the rearward limit of the punch in its feeding movement, the adjustments of the length of stroke being effective only at the forward limit of such movement,—where such changes are immaterial so far as the guiding of the work is concerned.

Presser foot.

96 is a presser foot bar mounted for sliding movement within a bearing opening 97 formed within the member 11 which projects downwardly from the cover plate 8, said presser-foot bar being normally held in its depressed position by a spring 98. The upper extremity of said presser-foot bar is provided with a toe 99 (see Fig. 27) adapted to take over a lug 100 formed upon the forward extremity of an arm 101 of a lever 102 pivoted upon the stub shaft 43 adjacent the lever 45, said lever 102 being provided with a second arm 103 arranged for engagement with a cam member 104 fixed upon the shaft 12 adjacent the cam 51. It will be evident from the above construction that upon each rotation of the shaft 12, the cam 104 will lift the lever member 102, thereby raising the presser-foot bar 96 against the action of its spring 98, such action of the presser foot being necessary for the proper feeding of the work. Attached to the lower end of the presser-foot bar, in any suitable manner, is a presser foot 105.

The presser foot 105, as shown in Figs. 3 and 5, is provided with a substantially one-point contact surface at 105$^a$, such contact surface being arranged to rest upon the work at a point adjacent the rearmost limit of travel of the punch in its feeding movement and at a point closely adjacent the margin of the work.

A preferred form of presser foot, however, employed with this machine, is that shown in detail in Fig. 29 in which 119 indicates the stem portion of the presser foot, and 120 a substantially U-shaped foot portion, said foot portion comprising a pair of opposed arms 121 extending substantially parallel to the row of perforations formed in the material. On the under surface of said foot portion are formed a pair of arcuate ribs 122 projecting downwardly and serving as the elements by which the presser foot bears upon the material operated upon.

These arcuate ribs form portions of a circle concentric with the center of the punch when the latter occupies its extreme rearward position. While as herein shown, these ribs 122 are spaced apart at their rear ends to leave a free opening in line with the direction of feed, it is within the scope of the invention to form the contacting element as a single rib extending from one side of said presser foot continuously around to the other side.

In the operation of the machine, the cam 104 lifts the presser foot against the action of spring 98 during the feed movement of the punch, but at the moment at which the punch reaches its extreme rearward limit of travel, the presser foot is permitted to drop and rest under tension of the spring 98 upon the material, the punch then being retracted for returning to its initial forward position. During this interval while the punch is being moved to its forward position the work, which is now held downwardly by the presser foot, may be freely turned about the center of curvature of the ribs 122 as an axis, thus permitting the work to be properly positioned for the next punching operation in accordance with the direction of the line of perforations being produced.

123 and 124 indicate, respectively, an edge gage for properly directing the work with relation to the position of the punch, and an auxiliary hold-down device which is intended to bear with a constant pressure upon the material, thereby assisting the presser foot in maintaining the same in proper operative position. The edge gage and auxiliary work hold-down are supported for adjustment upon the lower end of a post 125, suitably secured in the lower extremity of the member 11. As the edge gage and the auxiliary work hold-down present no features of novelty over what has been commonly employed in the prior art, further description of the same is unnecessary. It may be stated, however, that if desired, a similar post 125 may be located to the rear of that herein shown for adjustably securing a secondary auxiliary work hold-down to the rear of the presser foot.

Punch-bed or anvil.

The base member 1 is provided at a point near its left hand extremity, as seen in Fig. 1, with a slightly raised portion 126, upon which is secured, in any desired manner, a work plate or table 127, this plate being of relatively large area, and the upper surface thereof being suitably finished to permit ready movement of the material thereover. In said portion 126 of the base member is formed an opening 128, said opening serving as a guide wherein is mounted for vertical adjustment a punch bed or anvil 129. 130 is a lever pivoted at point 131 upon suitable lugs extending into the cavity 7 of the base member, the shorter arm 132 of said lever being located directly beneath the opening and serving to support the punch bed or anvil 129, which is freely slidable within said opening 128. The plate 127 is formed with an opening 133, said opening being of lesser area than that of anvil 129, the plate 127 thus serving to retain the anvil in operative position. By the removal of the plate 127, the anvil 129 may be readily removed from the guiding opening 128 and replaced by an anvil having its operative surface of a different form, such for instance as is shown in Fig. 14 at 129$^a$.

The bed plate or anvil members 129, 129$^a$ are formed with surfaces at 134 adapted to receive the blow of the punch and are provided upon opposite sides of said surface with upstanding guides 135, 136 and 135$^a$, 136$^a$, respectively, the purpose of which will be hereinafter stated. The front and rear edges of said anvils are formed with beveled-off portions 137, 138, the purpose of which will also be hereinafter stated.

The lever member 130, at the extremity opposite from that which supports the anvil, is provided with a longitudinal slot 139. Directly above said slot the bed plate is provided with a screw-threaded opening 140, in which is mounted an adjusting screw 141 having a knurled head 142, whereby the same may be turned by the hand of the operator. The lower extremity of this screw projects downwardly into the chamber 7 and rests upon the upper surface of lever member 130 bearing thereon upon each side of slot 139. The lower extremity of the screw 141 is provided with a threaded opening, with which is engaged an adjusting screw 143, said screw passing up through the slot 139 in the lever 130, there being interposed between said lever and the head of said screw a compression spring 144, screw 143 together with compression spring 144 serving to take up backlash due to wear between the end of the screw 141 and the surface of said lever 130.

It will readily be understood from the above construction, that by a turning movement of the screw 141, the arm 132 of lever 130 may have imparted thereto a vertical adjustment, whereby the height of the anvil 129 may be varied with respect to the lower limit of movement of the punch in its punching operation. Such adjustment of the anvil is desirable in machines of this character, in which a paper strip is used for cushioning the blow of the punch, due to the fact that the paper strips employed vary in thickness at different times, while, owing to the elasticity of the frame parts, the extreme lower limit of the punch in its punching movement may vary to a slight extent when running at different speeds. Furthermore, the punches employed vary slightly in length as received from the manufacturer, and in adjusting new punches to the machine it is desirable that the surface which receives the blow of the punch should be adjustable to correspond with such variations in length. By means of the screw 141, which has a relatively low pitch, and by reason of the fact that the anvil rests upon the shorter end of the lever 130, a fine or micrometer adjustment of the anvil is secured.

Paper feed.

As above noted, the shaft 12 at its right hand extremity is provided with an eccentric 35, acting upon rotation of the shaft to reciprocate the connecting rod 37. Mounted in suitable bearings provided in the rear portion of the base member 1, is a rotatable shaft 145, said shaft extending at its right hand extremity into the chamber 6 in the lower portion of said base member 1. Freely pivoted upon the extremity of said shaft 145 is a lever 146, having the longer arm 147 thereof extending forwardly and slotted as at 148 for the reception of a bolt 149 which may be adjustably secured in said slot by a thumb nut 150. The lower extremity of the connecting rod 37 is pivoted to turn upon the bolt 149, whereby rotation of shaft 12, through eccentric 35, serves to produce a rocking movement of the lever 146. By adjustment of the bolt 149 along the slot 148, the extent of the rocking movement of lever 146 about its pivot may be varied. To the shorter end 151 of the lever 146, at the point 152 is connected a pawl device adapted, through suitable ratchet mechanism fast upon the shaft 145, and indicated generally at 152ª, to produce an intermittent rotation of the latter. This pawl and ratchet device may be of any known construction, such as shown for example in patents to Noble, 1,032,621, July 16, 1912 (Figs. 5, 6, 7) or Noble 763,624, June 28, 1904 (Figs. 1 and 2), but forms no essential part of the present invention, and such device has therefore not herein been shown in detail.

The shaft 145, at its left hand extremity, as seen in Fig. 1, has fast thereon a pulley 153. Adjacent said pulley 153 and substantially in alinement with the plane of feed movement of the punch is a roll 154 fast upon said shaft. 155 is a bracket mounted for slight pivotal movement in boss 156 formed upon the rear of base member 1. Journaled for turning movement in said bracket is a shaft 157, said shaft being suitably held within its bearing bracket 155 by collars 158, 159 fixed to said shaft. The shaft 157 normally extends substantially parallel to the shaft 145 and at the extremity thereof is provided with a roll 160 fixed thereto and adapted to coöperate with the roll 154 of shaft 145.

Adjacent the roll 160, the shaft 157 is supported in a bearing member 161, said bearing member being pivotally supported upon the shorter arm 162 of a lever member pivoted upon the base member at 163. The longer arm of said lever is provided at the point 164 with a downwardly extending pin arranged to be supported within the coils of a compression spring 165 pocketed within an opening 166 in the base member 1. The extremity of said lever member is provided at 167 with a finger piece, whereby said lever may be depressed against the action of said spring, thus serving to lift the shorter arm 162 of said lever and thereby cause a separation of the rolls 154 and 160. The purpose of such separation is to permit of the ready insertion between said rolls of the end of the strip of paper which forms the punch-cushioning means, and which will be hereinafter described. Fixed to shaft 145 at 167' is a gear meshing with a gear 168 fixed upon shaft 157, said gears serving to transmit a positive driving motion from shaft 145 to shaft 157. 169 indicates a supporting bench or frame, upon which the base member 1 may be secured in any desired manner.

Bolted to the under side of said frame, as by means of bolts 170, is a supporting member or sleeve 171, said sleeve having supported for vertical sliding movement therein a bracket 172, (see Figs. 1 and 19). The cylindrical portion 173 of said bracket which slides within sleeve 172, is provided at one side thereof with a slot 174. 175 is a set screw having threaded engagement with a suitable opening in the sleeve 171, said set screw having a reduced end portion adapted to engage within the slot 174 whereby to prevent turning movement of said bracket with respect to the sleeve while at the same time permitting free vertical adjustment of the bracket with respect to the sleeve. Rotatably mounted within the bracket 172 is a shaft 176, said shaft having fixed upon its left hand extremity, as seen in Figs. 1 and 19, a pulley 177. The location of the sleeve 171, with respect to the base member 1, is such that the pulley 177 lies in the vertical plane of the pulley 153 on shaft 145, but below the same, an endless band or belt 178' passing around said pulleys 153 and 177, whereby the latter may be driven by the rotation of shaft 145. By reason of the free vertical movement of bracket 172 within sleeve 171, it is clear that the weight of said bracket tends to maintain the belt 178' in constant driving tension about the pulleys 153 and 177, thus insuring at all times a proper driving of the latter. Furthermore, by locating the drive mechanism for the paper feed below the plane of the work plate, the latter is left entirely free and unobstructed for manipulation of the work by the operator, a feature of considerable advantage in machines of this type.

178 indicates generally a paper-receiving reel or spool, fixedly mounted upon the right hand extremity of shaft 176 and rotatable therewith. The supporting bench 169, as shown in Fig. 1, is provided below the right hand portion of the base member 1 with a bracket 179, said bracket having at 180 a downwardly projecting spindle or pivot member, upon which is mounted to turn freely in a horizontal plane, a supporting arm or bracket 179a, said supporting arm being held in proper relation to said spindle by means of a collar 180a fixed upon the lower end of the latter. The free extremity of the supporting member 179a is provided with an upwardly extending pintle 181, upon which is mounted for free turning movement in a horizontal plane, a second paper receiving reel or spool 178a.

The spools 178 and 178a are of identical construction as follows,—182 is a hub member having a reduced portion 183, and provided with a longitudinally extending journal opening 184. 185 is a substantially flat circular disk of a diameter exceeding that of the diameter of the roll of paper commonly supplied to machines of this character, said disk being provided with a central opening adapted for the reception of the reduced portion 183 of hub member 182. 186 is a second disk, of a diameter approximating that of the central opening in the roll of paper employed, and having formed therein a central opening similar to that formed in disk 185, adapted to be slipped upon the reduced portion 183 of hub 182. The disk 186 is provided with a series of spaced apart upstanding resilient fingers 187, herein shown as forming a circular series extending around the entire circumference of the disk 186, and designed to engage within the central opening of the roll of paper. While as herein shown such fingers are arranged in a circular series, it is within the scope of the invention to provide a lesser number, in some cases two being sufficient for the purpose to be accomplished. The upper ends of these fingers may be, if desired, bent inwardly, shown at 188. 189 is a washer having a central opening adapted for the passage of the member 183 of hub 182, and being further provided with a series of openings 190.

In assembling the parts above described, the disk 186 is threaded on to the part 183, the portion of larger diameter of hub 182 being located within the series of fingers 187 and serving to limit inward movement of the same. Following the placing of disk 186 upon the hub member, the disk 185 is mounted thereon, followed by the washer 189. Screws, not herein shown, are then inserted in openings 190, and passing through similar openings in disks 185 and 186, are arranged to have threaded engagement with suitable openings in the hub 182, whereby the parts are securely held in proper relative position. The spool 178 is mounted upon the shaft 176 to rotate therewith, but to be freely removable therefrom by the following means,— 191 is a collar fixed upon the shaft 176 adjacent the end of its bearing in bracket 172, said collar being provided with an outstanding pin 192. The washer 189, disks 185 and 186, and hub 182 are provided with a series of alined openings, of which that in the hub 182 is indicated at 193, said openings being designed for entry of the pin 192. It will now be seen that by slipping the hub 182 upon the extremity of shaft 176, with the pin 192 located in the opening 193, the reel 178 will be caused to turn with the shaft 176, but may be readily removed therefrom as occasion may require.

The upstanding portion 126 of frame member 1 is provided at its front and rear portions with beveled surfaces 194, 195, said surfaces leading up to and into the forward and rear portions of the opening 133 formed in the work-supporting table 127, said beveled portions being in alinement with the beveled portions 137 and 138 of the punch bed or anvil member 129. The beveled portions 194, 195 and 137, 138, together with the upstanding guide elements 135 and 136 of the anvil 129, serve to properly guide the cushioning strip P over the surface 134 in position for receiving the blow of the punch.

The operation of the above parts is briefly as follows. Supporting arm 179a having been swung forward to bring the pintle 181 out from beneath the bench 169, and spool or reel 178a having been placed upon said pintle 181, the roll P' of paper forming the cushioning strip P is forced down over the resilient arms 187, and permitted to rest upon the disk 185. The end of the paper strip is then led along beneath the bench to an opening 196 formed in said bench and positioned to guide said strip for engagement by the beveled surface 194 of the frame member 1. The end of the strip is led upwardly through this opening, over said bevel surface 194, over the bevel surface 137 of anvil 129, between guide members 135 and 136 thereof, thence downwardly over beveled surfaces 138 and 195 and between the rolls 154 and 160, the latter having been raised by depression of the finger member 167 of the lever 162. The paper then passes downwardly through a second opening 197 formed in the bench and is passed down to, and secured about, one or more of the fingers 187 of reel 178 in any desired manner. Arm 179$^a$ is now swung back under the bench carrying reel 178$^a$ with it. Upon rotation of the shaft 12 of the machine, the shaft 145, through the connections described, is caused to be intermittently rotated, thereby through the rolls 154 and 160 acting to positively pull off the paper strip from the reel 178$^a$. Simultaneously with such movement, the pulley 153, through the belt 178′ causes rotation of the reel 178, thereby winding up the paper strip upon said latter reel. When the paper strip has been entirely wound on reel 178, the support 179$^a$ will again be swung forwardly, the empty reel 178$^a$ removed therefrom, and the reel 178, which now contains the entire paper strip, will be placed upon pintle 181, the reel 178$^a$ placed upon the shaft 176, the end of the paper drawn from reel 178 and threaded through the machine and connected to reel 178$^a$ to be rewound thereon, and the support 179$^a$ will be swung to its rearward position.

As will be noted from inspection of Figs. 1 and 18, the same surface of the paper strip will be presented to the punch during its second traverse through the machine, but by reason of the interchanging of reels, as above indicated, that edge of the strip which previously moved in contact with guide member 136, will now, on its second traverse, move in contact with guide 135.

As the paper strip employed is of a width substantially greater than the width of the group of punches usually used, the indentations caused by the punch in such strip do not cover the entire surface thereof, and it is desirable, in order to avoid waste of paper, to have the strip travel more than once through the machine, presenting at each fresh passage thereof new surfaces for engagement by the punch. The impressions made in the paper during the first passage of the same through the machine may be caused to occupy the right hand edge of the paper, by reason of the relative position of guides 135 and 136 which being unsymmetrical with respect to the plane of traverse of the center of the punch in its feeding movement tend to cause the center line of paper to pass to the left of said plane.

As during the second passage of the paper strip through the machine the opposite edge thereof comes in contact with the guide 136, the new impressions formed by the punch in the paper occur along the opposite edge thereof from those first formed, thus securing an economic use of the paper, while at the same time avoiding overlapping of the impressions which would tend to produce an imperfect action of the punch in cutting. After the second passage of the paper through the machine, as above described, the reels may be again interchanged, and at the same time an anvil of the form of that shown at 129$^a$ (Fig. 13) may be substituted for that shown in Fig. 12. As will be noted from inspection of Fig. 13, the guides 135$^a$ and 136$^a$ are arranged symmetrically with respect to the center line of the anvil and thereby cause the center line of the paper to travel in the plane of the center line of the punch in its feeding movement. This causes the impressions made by the punch upon the paper, while in the same surface thereof as previously formed, to be located between the two lines of impressions already made therein, thus serving further to utilize the entire paper strip.

After the third passage of the paper strip through the machine, the strip is discarded and a fresh strip is introduced, which, on its first passage, may be caused to travel over the anvil 129$^a$, after which anvil 129 will be substituted, the paper strip in its next two succeeding passages moving over the latter anvil. It is obvious that if a punch holder employing a large and complicated group of punches be employed the area of the paper strip impressed thereby may be such as to preclude a second or third passage of the paper through the machine, in which case either of the anvils 129 or 129$^a$ may alone be employed as occasion may direct. The paper feed mechanism *per se* is not claimed in this application, being subject matter of applicant's application Ser. No. 276,609, filed February 12, 1919.

Stop mechanism.

The present machine has been provided with suitable mechanism, whereby the operation thereof may be closely controlled by the operator, said mechanism further including an arrangement of parts, whereby the machine may be caused to stop automatically when the line of perforations formed in the material has approached to within a predetermined distance of the edge of such material.

The stopping mechanism herein employed comprises a bracket member 200 (see Fig. 23) secured within the chamber 5 upon bosses projecting from the inner wall of the latter by means of suitable fastening devices 201, 202, or in any other well known manner. Pivoted for swinging movement upon the forward face of said bracket, at the point 203, is a lever member 204 provided at its upper extremity with a roll 205 arranged to engage within the cam groove 206 in the cam sleeve 40. The lower extremity of said lever is provided with a cam incline 207, for a purpose to be hereinafter described.

209 is a slidable dog, having a shoulder 210, and arranged for vertical sliding movement within a suitable guide opening in the bracket 200, said dog being carried upon the upper end of a rod 208 extending downwardly to a point below said bracket 200, and provided near its lower extremity with adjustably fixed collar 211. The dog 209 is normally held in upper position by means of a compression spring 212 (see Fig. 30) located within a cavity in the bracket 200, such dog, when in projected position, presenting its shoulder 210 in the path of the lower extremity of lever 204. It will be apparent upon consideration of the above mechanism, that when said dog is in such projected position the lower end of the lever 204 is prevented from swinging to the left in a vertical plane through the pivot thereof. Under such circumstances, rotation of the shaft 12 together with the cam sleeve 40, will cause the cam slot 206 in said sleeve, in traveling over the roll 205, to force the sleeve 40 longitudinally of the shaft against the action of spring 41, thereby withdrawing pin 39 from the opening 34 in collar 33 and thus unlocking the shaft 12 from drive shaft 19, (this being the position of parts in Fig. 1). 213 is a second cam fixed to the sleeve 40 and movable therewith. Such cam may, if desired, be formed integral with sleeve 40 or separate therefrom, but fixed thereto. The cam 213 is provided with a raised cam portion 214 of gradually increasing height, following which is an abrupt depression or notch 215, having a stop shoulder 216 forming one wall thereof. 217 is a stop dog mounted within a slot 218 in the rear of the bracket 200, said stop dog comprising a suitably formed end portion for engagement with the cam 214 and notch 215, and having extending downwardly therefrom a tail member 220 mounted for sliding movement in a suitable opening in pin 221 pivotally mounted in the side walls of the slot 218. Surrounding said tail member 220 is a compression spring 222, said spring bearing upon the lower portion of the dog 217 at one end, and against the pin 221 at the other end, tending normally to maintain said dog in its uppermost position for engagement with cam 213. The lower extremity of the tail member 220 may be provided at 223 with lock nuts to prevent the dog from being projected entirely out of the pin 221.

The dog 217 is resiliently supported against rearward movement about its pivot pin 221 by engagement with a bearing plate $225^x$ carried upon the forward end of a rod 225, said rod passing loosely through a guiding opening 226 formed in a boss projecting from the rear of post 2. Surrounding the pin is a stiff coil spring 228 bearing at one end on plate $225^x$ and having its opposite end seated within a pocket formed in the interior of said outwardly projecting boss, the rod 225 having a washer 227 mounted thereon exterior of said boss and bearing against the same to limit forward movement of the rod under action of spring 228, said washer being adjustably held in position by means of a nut screwthreaded upon the end of the rod.

When the drive clutch mechanism is in operative position, the dog 217 lies in a plane to the left of the plane of rotation of cam 213, and therefore fails to contact with the latter. Upon projection, however, of the dog 209 into the path of oscillation of lever 204, the cam sleeve 40, as above described, will be caused to move along the shaft 12 to the left, thereby causing a separation of the pin 39 from the opening 34. Simultaneously with this movement the cam 213 is brought into the path of the dog 217, the timing of the parts being such that the dog 217 will contact initially with the lower portion of said cam 213. As said cam continues to revolve, the portion 214 thereof, contacting with the dog 217, tends to depress the latter against the action of spring 222, while at the same time greatly retarding the momentum of the shaft 12 and the parts operated thereby. As the dog 217 reaches the notch 215 it snaps upwardly thereinto, and is brought in contact with the abrupt stop shoulder 216, thus serving to positively stop the rotation of shaft 12.

It has been found in practice, when restarting the machine, that at times the pin 39 fails to become properly seated in the opening 34, and the edge of the cam 213 is sometimes caused to strike the dog 217 while positively driven by the drive shaft 19. Under such circumstances a breakage of parts would be likely to occur and to avoid this the dog 217, as has herein been shown, has been resiliently mounted for swinging movement against compression spring 228. With the present construction, if the blow of the shoulder 216 against the dog 217 be of sufficient intensity, said dog will give slightly in a rearward direction against the action of the spring 228, permitting the cam to slip past the same. As the pin 39 will generally properly seat itself before the second rotation, the cam 213 will in most cases not strike said dog 217 a second time, but in any case the latter is saved from breakage. Furthermore, by reason of such resilient mounting of the dog the shock in stopping the machine under normal circumstances is somewhat lessened, the dog tending to move backward slightly under impact by the shoulder 216, and then moving forward slightly, thus bringing the parts to proper stopping position.

Pivoted upon a lug 229 within the chamber 5, and adjacent the lower end of the member 208, is a lever 230, said lever being forked at its right hand extremity as indicated at 231 for the reception of member 208, the forked extremity of said lever being located above the collar 211. The opposite extremity of lever 230 has pivotally mounted thereon, at the point 232, a latch 233. At 234 is a light compression spring mounted in a pocket in said lever 230 and bearing against the lower portion of latch 233, said spring tending to turn said latch member about its pivot 232 in a counter-clockwise direction. The upper extremity of said latch is provided with an overhanging shoulder 235 and with an inclined cam portion 236.

237 indicates a latch plate suitably secured against the inner wall of said post 2 and closely adjacent said latch member 233, said plate being provided with a substantially horizontal shoulder 238, forming a fixed abutment adapted for engagement with the shoulder 235 of latch 233. 239 is a pin passing through the wall of the post 2 opposite the left hand surface of latch 233 and provided with an enlarged head 240 serving for engagement by the hand of the operator, said pin being held normally in retracted position and out of contact with latch 233 by means of a spring 241 located beneath said head 240.

Mounted for pivotal movement in a lug 242 projecting from the rear of the post 2 and in a journal opening formed in the lower portion of the bracket 106 is a shaft 243, this shaft being suitably secured against endwise movement by collars 244 and 245 fixed thereon. 246 is an opening through the rear wall of post 2 leading into chamber 5 and adjacent the upper end of latch 233.

Fixed upon the shaft 243 adjacent the opening 246 and projecting through the latter is a lever 247. This lever may, as herein shown, be formed integral with the collar 244 or separate therefrom, if desired. Upon the forward extremity of lever 247 is a cam member 248, said cam member being adapted for engagement with the upper cam portion 236 of latch 233 and being provided at its upper portion with a small weight 249. Near the opposite extremity of the shaft 243 and integral with the collar 245, if desired, is a finger lever 250, said lever being arranged to project through a suitably formed opening 251, (see Fig. 5) in the member 11 and provided at its forward extremity with a finger-engaging element 252. Movement of the member 252 in an upward direction thus serves to lift the cam member 248 out of engagement with the cam portion 236 of latch 233. 253 is a locking pin arranged normally to be held out of the path of the finger lever 250, but which may be caused to project into the path thereof when said lever has been raised to thereby hold the same in elevated position, said pin being substantially identical in construction with pin 268$^d$ hereafter described in detail.

Fixed upon the upper portion of the presser-foot bar 96 is a collar 96$^a$, said collar having projecting downwardly therefrom a rod 96$^b$, the lower extremity of said rod being arranged directly over but spaced from the lever arm 250. By the above arrangement, it will be seen that lifting of the lever arm 250 will serve not only to raise the cam member 248, but will simultaneously, through the rod 96$^b$, lift the presser foot 105.

At its extreme left hand extremity, as viewed in Fig. 1, the shaft 243 is provided with a fixed lever arm 254, said arm having an opening 255 at its forward extremity and passing therethrough. 256 (see Figs. 1 and 31) is a bracket in the form of a cylindrical rod fixed within the member 11 and projecting to the left thereof. 257 is a T shaped bracket having vertical and horizontal sleeve portions, the horizontal portion thereof being arranged to slip over the free extremity of rod 256 and to be removably secured thereto by any suitable means such for example as a spring clip 258 adapted for engagement with a notch 258$^a$ formed in said rod 256. The vertical portion of said bracket 257 forms a guideway in which is mounted for sliding movement a feeler finger 259, said feeler finger being formed at its upper extremity with a portion bent at right angles thereto and adapted for insertion in the opening 255 in the end of lever arm 254. The feeler finger 259 is of such length as to reach downwardly to the work table 127, and to be supported in raised position by resting upon the upper surface of the work lying upon said table. The table, at a point in alinement with said feeler finger 259, may, if desired, be provided with an opening 260 permitting the extremity of said finger to move downwardly to a point slightly below the surface of the work table.

By reason of the mounting of the feeler finger 259 in the bracket 257, as above described, it will readily be appreciated that the same may be removed from the machine by merely slipping the bracket 257 from off the extremity of the member 256, the upper extremity of the feeler finger being readily detached from the opening in the lever arm 254, thus permitting the feeler finger to be placed in operative position or to entirely be removed without any substantial change in the machine structure as a whole.

Within the chamber 7 and projecting downwardly from the upper wall thereof is a bracket 261 having pivotally mounted therein one extremity of a lever 262, said lever projecting to the right of its pivot, as shown in Figs. 1 and 23, and to a point substantially beneath the lever 230, at which point lever 262 is provided with an outstanding pin 263. 264 is a shaft located in the chamber 7 and passing from front to rear through the walls of the base member 1, and having bearings therein wherein said shaft may be rocked. Upon the rear extremity of said shaft 264, is a lever arm 265, said lever arm having pivotally connected to its outer extremity a link 266 adapted to pass downwardly to a point below the bench, and to have connected thereto a treadle device 267, said treadle device being centrally pivoted and arranged for actuation by the operator, whereby rod 266 may be held in central position, or may be moved upwardly or downwardly from such position, whereby to cause an upward or downward movement of lever arm 265 and a corresponding rocking movement of shaft 264.

268 is a yoke member fixedly mounted on shaft 264 to rock therewith, and having the upper portion thereof located directly beneath the pin 263. The upper edge of said yoke member provides a cam surface comprising a central portion 269 concentric with the axis of shaft 264 and having at either end thereof depressions 270, 271 adapted for the reception of pin 263. 272 is a bar guided for vertical movement within an opening 273 leading from chamber 7 upwardly through the frame to the chamber 5, and having its lower extremity loosely supported upon the upper surface of lever 262 closely adjacent the pin 263. The upper extremity of bar 272 lies beneath the lever 230, and adjacent the pivotal point of latch 233 thereon.

The yoke member 268 may, as herein shown, be provided with an opening at 268$^a$ adapted for engagement by the extremity of a pin 268$^d$ mounted for sliding movement within a sleeve 268$^e$ fixed within the forward portion of the base member 1. The pin 268$^d$ projects forwardly beyond the end of the sleeve 268$^e$, and has fixed thereon a thumb nut 268$^c$, and is further provided with a transversely extending pin 268$^b$ arranged for engagement within a slot 268′ extending transversely of the end of the sleeve 268$^e$. A spring may be provided surrounding the pin 268$^d$ within the sleeve and tending to project the extremity of the pin into the opening 268$^a$ of yoke member 268. The operator may, however, by manipulation of the thumb nut 268$^c$ withdraw the pin from said opening, and by a quarter turn cause the transverse pin 268$^b$ to move out of engagement with the slot 268′, thereby retaining said pin 268$^d$ out of engagement with the opening 268$^a$. Upon turning said member 268$^c$ into position to permit the pin 268$^b$ to again enter said slot, the pin 268$^d$ may be permitted to enter the opening 268$^a$, thereby locking the yoke member 268 against rocking movement. As in changing the punches and in making various adjustments of parts adjacent thereto it is necessary for the operator to place his fingers beneath the punch carrier, it is desirable to prevent accidental movement of the treadle such as might cause injury to the operator by accidental starting of the machine at this time and pin 268$^d$ has therefore been provided, said pin constituting a safety device to lock shaft 264 against actuation.

Pivoted to turn upon the forward end of shaft 264, which projects through the front of the base member 1, is a sleeve 276, suitable means being provided whereby said sleeve is prevented from moving longitudinally of said shaft while permitting the free rotation of the same. That portion of the sleeve which is adjacent the base member 1 is provided with a pair of oppositely disposed lugs 277, said lugs being provided with adjustable stop screws 278, adapted to bear at their lower extremities upon the upper surface of the base member 1 and serving to adjustably limit the rocking movement of sleeve 276 about shaft 264. Passing through an opening formed in the outer extremity of the sleeve 276 is a rod 280 which may be adjustably secured within said opening as by means of a set screw 279. The rod 280, as herein shown, is bent downwardly to the left of sleeve 276 (see Fig. 1), providing a depending portion 281 extending down to a point below the bench 169 where an adjustable knee-engaging member 282 is secured thereto, said member being properly positioned for ready engagement by the knee of the operator, whereby the member 280 serves as a means for rocking the sleeve 276 about shaft 264.

The sleeve 276, at its inner extremity, is provided with an upstanding lever arm 283, having projecting inwardly near its upper end a lug 284. Pivotally connected to the end of the lug 284 is a link member 285, said link member passing through a suitable opening in the frame and into chamber 6. 288 is a pin passing transversely through the link 285 within the chamber 6, and serving as an abutment against which one end of a compression spring 289 surrounding said link 285 bears, the opposite extremity of said spring resting against the wall of chamber 6, spring 289 thus normally tending to so move the link member 285 as to rock the sleeve 276 in a clockwise direction.

Upon the right hand outer surface of the post 2, as shown in Figs. 1 and 4, is formed a bracket 290ª providing a journal opening wherein is mounted a rock shaft 290, said shaft having fast upon its forward end a rocker arm 290ᵇ extending downwardly therefrom, rocker arm 290ᵇ being retained upon said shaft by means of a collar 290ᶜ. Upon the rear extremity of the shaft 290 is mounted a collar 290ᵈ, having extending upwardly therefrom a belt shifter lever 291, said belt shifter lever being provided with a pair of parallel slots 292,293 adapted for engagement with belts 274, 275, respectively, said slots being spaced at such a distance apart as to maintain said belts 274, 275 in engagement with adjacent pulleys of the series of drive pulleys 21, 24 and 26 above described. It will be seen, however, that by a rocking movement of the sleeve 276 against the action of the spring 289 the upper extremity of the belt shifter, as shown in Fig. 1, may be caused to move to the right, thereby simultaneously shifting the respective belts 274, 275 to the pulleys next adjacent and to the right of their normal position, and that upon disengagement of the member 282 by the knee of the operator, the spring 289 will automatically move the belt shifter lever to restore the belts 274, 275 to the position shown in Fig. 1. The belts 274, 275 are designed to be driven at different speeds, as for example, by passing around pulleys of different diameter upon a suitable power shaft, not shown, it being assumed that the belt 275 travels at a higher speed than belt 274.

With the above described construction, in the normal operation of the machine, belt 274, which engages pulley 21, serves to drive the shaft 19 at a relatively low speed, the belt 275 merely serving to rotate the loose pulley 24. If, during the operation, the operator finds it desirable to increase the speed of the machine, as when forming relatively long, straight lines of perforations, he may, by engaging the member 282 with his knee, cause a simultaneous shifting of belts to the right of their position in Fig. 4, thereby moving belt 275 onto fast pulley 26 and simultaneously moving belt 274 onto loose pulley 24. The speed of the machine will be instantly increased in accordance with the ratio of speeds of the two belts 274, 275, and such high speed movement may continue so long as the operator continues to press against the member 282.

In certain cases it may be found desirable to dispense with the knee device 280 and to substitute therefor a finger operated device, such as shown for example in Fig. 22, said device comprising a sleeve portion 294, having extending therefrom a rod 295, provided with a bent extremity 296. In the employment of this device, the collar 290ᶜ is removed from shaft 290 and the sleeve 294 is secured upon the end of said shaft as by means of a set screw 297, sleeve 294 being so positioned that rod 295 extends transversely across the front of post 2, in a plane slightly inclined to the horizontal, with the bent portion 296 lying against the left hand surface of said post 2 and just above the base member 1. It will now be evident that by a slight lifting movement of the end 296 of rod 295, the rock shaft 290 together with the belt shifter 291, may be moved as above indicated to cause the belts 274, 275 to be shifted to the right. While in the ordinary use of the machine the knee operated part 280 would be removed when employing the finger member 295, it is clear from the construction described that both of these elements may be used simultaneously, if desired.

The stop motion *per se* is not claimed in this application, being subject matter of applicant's application Ser. No. 276,610, filed February 12, 1919.

*Operation.*

The operation of the machine in general is as follows, assuming in the first instance that the feeler member 259 is employed, and that a strip of paper P has been mounted upon the reel 178ª and properly threaded through the machine, the end thereof being secured to the reel 178. With the feeler finger in position, and the parts as shown in Fig. 1, the clutch pin 39 being out of engagement with the opening 34, the operator will first lift the finger piece 252, thereby rocking the shaft 243, simultaneously raising the presser foot through the action of rod 96ᵇ and lifting the feeler finger 259 through its connection with lever arm 254. The work may now be introduced beneath the presser foot and in proper position for the punching operation. Upon release of the finger piece 252, the lever 254 will drop until the feeler finger 259 rests upon, and is supported by the surface of the material, thus preventing further turning movement of shaft 243. As it will be noted that the end of the pin 90ᵇ is normally at a substantial distance above lever 250, it is only during final upward movement of the latter that the presser foot is raised so that upon release of said lever 250 the presser foot will be permitted to move downwardly under the action of its spring and into contact with the work, even though the lever 250 be held in partially elevated position by the feeler finger.

Due to the fact that the feeler finger 259 is supported upon the surface of the work, the cam member 248, carried upon the right hand extremity of shaft 243, is held in elevated position, and out of contact with the cam surface 236 of latch 233. In order now to start the machine the operator will depress the treadle sufficiently to bring the pin 263 into engagement with the elevated part 269 of the yoke 268, thereby first raising the bar 272 into engagement with lever 230, rocking the latter in a clockwise direction, and then as the yoke 268 swings farther, permitting said bar to drop into the depression 270. The engagement of the forked extremity of the lever 230 with the collar 211 upon the lower extremity of the member 208 causes a depression of the dog 209 against the action of its lifting spring, removing the shoulder 210 of the same from the path of the oscillating lever 204. As the drive shaft 19 rotates, being constantly driven by one or the other of the belts 274, 275, the openings 34 in the disk 33 are successively brought opposite the extremity of pin 39 and as the cam sleeve 40 is under continuous compression by spring 41 tending to urge the same in a right hand direction along the shaft, as shown in Fig. 1, and as the lever 204 is now free to oscillate about its pivot 203, the pin tends to snap into the first opening 34 which passes the end of the same, thus coupling the drive shaft 19 to the shaft 12 to rotate the latter. During the instant of upward movement of the latch-carrying end of lever 230 under action of bar 262, the latch 233, which is held in engagement with the plate 237 by means of spring 234, moves upwardly and the shoulder 235 thereof snaps over the abutment 238 and into locking engagement with the same, the cam member 248 at this time being, as above stated, out of position to engage the cam surface 236 of latch 233. Engagement of the latch 233 with said abutment thus holds the dog 209 down out of the path of movement of the lower extremity of the oscillating lever 204, whereby the machine is permitted to operate continuously.

While the machine is operating under control of the feeler 259, with the latch 233 in engagement with the abutment 238, the cam incline 207 of lever 204 wipes across the upper extremity of the dog 209 at each oscillation of the lever, causing the dog to be slightly depressed against the action of its spring 212, thereby tending to slightly lift the shoulder 235 of latch 233 from the abutment 238. As, however, at this time, the cam member 248 is lifted entirely free of the end of said latch, there is no tendency of the latch to slip off from said abutment 238, the spring 234 being sufficient to retain the shoulder 235 of said latch in position to engage the abutment 238 immediately upon release of the dog 209 as the cam incline 207 swings from over the same. The lifting of said latch from frictional engagement with shoulder 238 renders the latch very delicate in operation, however, so that the cam member 248 and the feeler finger may be made very light in weight and consequently extremely quick and sensitive in action.

The presser foot having descended, as above indicated, to hold the work in proper position, the shaft 12 is caused to rotate in a clockwise direction, as seen in Fig. 26. As shown in said figure the high parts of the cams 50 and 51 are in their uppermost position, the roll 52 resting upon the surface of cam 51, thereby holding the lever member 44, together with the punch carrier, in elevated position. As the shaft 12 rotates carrying with it cams 50 and 51, the elevated portion of cam 50 will engage roll 53 causing a downward movement of the same in the arc of a circle about the center of pivot 43. Due to the connection of links 59 and 60 with the pivot pin 57, said links, together with lever 44, constitute a toggle which is gradually straightened as the roll 53 moves downwardly under action of cam 50, thus moving the punch carrier downward with a constantly increasing pressure until said roll 53 has reached the highest portion 55, of cam 50.

Immediately following said high portion of said cam 50, the said cam is slightly relieved, permitting the punch to rise very slightly from its lowermost position, the punch being held in this position throughout the feeding movement thereof by the concentric portion 55$^a$ of said cam 50. As the roll 53 engages the relieved portion of the cam 50, the eccentric 111 causes a rocking movement of arm 108, whereby the punch carrier, through the connecting link 116, is caused to swing in a rearward direction about the vertical pivot of bracket 63. Due to the length of the arm 64 of said bracket, the circular arc of travel of the punch in its feeding movement is so flat that the effect thereof is inappreciable in the operation of the machine. As the punch swings rearwardly in its feeding movement, being still engaged with the work, it moves the latter rearwardly beneath the presser foot, the latter having been raised simultaneously with the beginning of such feeding movement by engagement of cam 104 with lever arm 103. The punch moves backwardly to the rearward limit of its stroke at which point it enters between the opposed arms 122 of the presser foot. As the punch reaches this point the presser foot is permitted to fall by the further rotation of cam 104, and simultaneously therewith the punch is elevated by engagement of the high part of cam 51 with roll 52. Following the rising movement of the punch the latter is retained in elevated position by traveling over the high portion of cam 51 which is concentric with the shaft, the eccentric 111 at this time rocking the arm 108 rearwardly, thereby restoring the punch carrier to its forward position ready for the next succeeding punching operation.

During the forward movement of the punch, the work, which is at this time engaged and held in proper position by the presser foot, may be readily swung upon said presser foot as a center by reason of the engagement of the circular ribs 122 of said presser foot with the work, said ribs presenting but a small portion for frictional engagement of the work, thereby permitting ready turning movement, while at the same time avoiding any possibility of the slipping of the work with respect thereto.

The machine will thus continue to form a series of perforations in the material until the feeler finger, which rests upon the work in a position in advance of the punch, in the plane of feeding movement of the latter, rides off the edge of the work as the same is fed toward the punch. The feeler finger immediately drops under its own weight into the opening 260 in the work table, thereby permitting the cam member 248 to fall. Said cam member in falling, engages the cam surface 236 of latch 233, and forces the same off the abutment 238, thereby permitting said latch member, together with lever 230, to drop, the latch-carrying end of said lever being heavier than the forked extremity thereof. The dog 209 immediately rises, under action of its projecting spring, into the path of the lower extremity of lever 204, the oscillation of which is immediately stopped thereby, in the manner above described, causing a sliding movement of sleeve 40 along the shaft 12, thus disengaging the clutch pin 39 from opening 34 and simultaneously engaging the stop shoulder 216 with the stop dog 217 to stop the rotation of shaft 12. The machine having stopped, as above described, and it being desired to introduce a new piece of material, the finger piece 252 is again lifted and the preceding operation repeated.

If, during the above operation, and while the machine is forming a series of perforations, it be desired, for any reason, to stop the machine, the operator may, by pushing inwardly upon the head 240 of the pin 239, remove the latch 233 from its engagement with abutment 238, thereby permitting the latch to fall and the dog 209 to rise in the same manner as above indicated to cause a disengagement of the clutch mechanism.

The feeler finger as above described is of special use when the machine is employed for forming the perforations upon the blanks intended to form the tips of shoes, in which the line of perforations begins and terminates at a considerable distance from the opposite edges of the blank. The operator is enabled by this device to insert the material to a point such that the first perforation will be at the desired distance from the starting edge and then by proper setting of the feeler finger insure the stopping of the machine with the punch at a corresponding distance from the final edge of the piece of material passed through the machine.

When it is desired to use the machine without the feeler mechanism the same may be readily removed from the machine as above indicated, the machine now being entirely under the control of the operator. Under these conditions in order for the machine to operate to form a contiuous series of perforations, the operator introduces the fabric by first lifting and then releasing the finger member 252, thus raising the presser foot and cam member 248 and permitting the same to fall again, cam 248 when in the latter position preventing latch 233 from engaging over abutment 238. The treadle is now depressed to its central position, whereby the pin 263 rides up upon the concentric portion 269 of rocker 268, the forked extremity 231 of the lever 230 thus being held in downward position depressing the dog 209 and permitting the machine to start into operation. So long as the treadle is held in its central position the machine will continue to operate, the dog being held in its lowermost position, but upon further depression of the treadle from its central position in either direction the pin 263 will drop into one or the other of the depressions 270, 271, thereby permitting the latch-carrying end 233 of lever 230 to drop and allowing the dog 209 to rise into stopping position. As in the above described operation, the cam member 248 in starting the machine has been permitted to drop, the latch member 233 was prevented from engaging the abutment 238, and thus, as the treadle is further depressed as above indicated, the latch fails to prevent dropping of lever 230 in the manner stated, and the machine will be brought to rest.

If it is desired that the machine make but a single perforation and then come to rest, the operator, after inserting the work beneath the presser foot, will depress the treadle member from one extreme position to the other. By so moving the treadle the pin 263 will be caused to travel from one of the depressions 270, 271 to the other, but midway of its travel the pin will be elevated by cam portion 269 of yoke 268, thereby lifting the latch-carrying lever 230,—latch 233, however, being prevented from engaging abutment 238 by cam member 248. At the same time the dog 209 is depressed to permit rotation of the shaft 12. As pin 263 immediately thereafter drops into the other depression of yoke 268, lever 230 drops, thus permitting the rising of dog 209 whereby the machine is immediately stopped. A second depression of the treadle to its other extreme of movement will cause a similar succession of operations, the result thereof being that upon each depression of the treadle the machine will make one or more complete cycles of movement and then stop, the number of such cycles depending upon the rapidity of movement of the treadle from one extreme position to the other. This arrangement is of advantage under certain conditions of operation, such for example, as in operating upon work wherein extremely sharp changes of direction of feed movement are necessary, and wherein with the machine continuously operating it is difficult to prevent running off of the edge of the material. If in operating the machine as just described the operator should retain member 252 in elevated position while actuating the treadle, the latch might become engaged with abutment 238 and as the weight of cam member 248 alone is insufficient to disengage the latch 233 from abutment 238, due to the frictional engagement between said parts, the machine would be kept in continuous action. To avoid such accidental occurrence the cam incline 207 on the lower extremity of the oscillating lever 204 has been provided, which in swinging over the top of the dog 209 causes a slight additional depression of the same. The cam 207 thus produces a slight upward movement of the latch-carrying end of lever 230, sufficient to reduce the frictional engagement of the shoulder 235 with the abutment 238 as above described and to such an extent as to permit cam member 248 to disengage the latch from said abutment, permitting the dog 209 to rise to such a position that upon the next successive oscillation of the lever 204 the clutch will be thrown out of operation and the machine brought to rest. While the mechanism shown and described is a preferred embodiment of my invention it will be understood that various changes and modifications of the structure herein shown are contemplated as falling within the scope of the claims.

Having fully described the invention and the construction and mode of operation of a machine embodying the same what is claimed as new is,—

1. In a perforating machine, in combination, a reciprocable punch, and means for positively reciprocating said punch in opposite directions, said means including a rotatable drive shaft and a cam device carried thereby, said cam device comprising a pair of spaced apart cams each moving said punch in one direction only and having their active portions upon the same side of the shaft.

2. In a perforating machine, in combination, a rotary drive shaft, a reciprocable punch carrier, and cam means carried by said shaft for reciprocating the carrier, said means comprising a sleeve fast to the shaft, a lifting cam fixed to one end of said sleeve, and a depressing cam fixed to the opposite end of said sleeve, the active portions of said cams being both upon the same side of the drive shaft.

3. In a perforating machine having a reciprocable punch, in combination, a drive shaft having a pair of cams fixed thereon, a pivotally mounted lever device having spaced arms, the extremities of said arms being provided with means for engaging the respective cams, and means for connecting said lever device with the punch for vibrating the latter.

4. In a punch operating mechanism, in combination, a punch carrier reciprocable in a rectilinear path, a lever member pivoted at one end to swing about a fixed fulcrum, a link connection between the free extremity of said lever and the carrier, and a cam having operative engagement with the free extremity of said lever.

5. In a perforating machine having a reciprocable punch, in combination, mechanism for reciprocating said punch comprising a drive shaft, a punch depressing and a punch elevating cam fixed thereon and having their active portions upon the same side of the drive shaft, and a punch actuating lever pivoted to turn about an axis parallel to the drive shaft and provided with a roll engaging the punch-depressing cam, said lever having an arm adjustably connected therewith and provided with a roll engaging said elevating cam, the adjustable connection between said lever and arm providing for taking up backlash between said rolls and the respective cams.

6. In a perforating machine, in combination, a feed frame, a pair of alined guiding members upon said frame, a punch carrier guided for reciprocation by said members, link members disposed respectively at opposite sides of said guiding members and each having one end pivotally connected with said carrier and means for moving said link members for reciprocating the carrier.

7. In a perforating machine, in combination, a pivoted feed frame, a punch carrier slidable upon said frame, a lever arm, means for rocking said arm and a pair of link members having their opposite ends connected to said lever and said carrier, respectively.

8. In a perforating machine, in combination, a feed frame pivoted to swing about a vertical axis, a pair of spaced apart guide openings in said frame, a punch carrier vertically slidable within said openings, a drive shaft, a rockable lever, cam means upon said shaft for rocking said lever, and a pair of links disposed upon diametrically opposite sides of said carrier and having their opposite ends connected to said lever and the lower portion of said carrier, respectively.

9. In a machine of the class described, in combination, a support, a feed frame pivoted thereto to swing about a vertical axis, a punch carrier, means for guiding said punch carrier for vertical, rectilinear reciprocation in said frame, means for swinging said frame and means for reciprocating the punch carrier.

10. In a machine of the class described comprising a pivotally supported feed frame and a punch reciprocable thereon, in combination, means for reciprocating said punch and means for swinging said frame, said latter means comprising a sector rockable in a vertical plane, means for rocking said sector, and a link having one end thereof pivoted to said frame, and having its opposite end adjustably connected to said sector.

11. In a leather perforating machine having a vertically reciprocable punch, in combination, a pivotally mounted feed frame, and means for swinging said frame for feeding the work, the limit of swinging movement of said frame in the direction of feed being fixed, and the limit of movement in the opposite direction being variable.

12. In a perforating machine having a pivotally mounted feed frame and a punch reciprocable thereon, in combination, means for swinging said frame for feeding the work comprising a rockable sector having an arcuate slot therein, a link having one end thereof pivotally connected to said frame and having its opposite end adjustably connected for slidable movement along said slot, the point of connection of said link with said frame being at the center of curvature of said slot when said frame is at the limit of the feeding movement.

13. In a perforating machine, in combination, a reciprocable punch carrier and means for guiding and reciprocating the same, said carrier comprising an upper portion for engagement with said guiding means and an enlarged lower portion formed with a chip cavity and operatively connected to the reciprocating means and provided with punch-holding devices, and a hollow punch sustained by said punch-holding devices.

14. In a device for forming perforations in sheet material a hollow punch, a member carrying said punch and having a cavity for receiving the chips cut thereby, and means for preventing jamming of the chips within said cavity.

15. In a machine of the class described, in combination, a reciprocable punch carrier comprising a tubular stem having an enlarged lower portion, a punch holding clamp carried thereby, a shaft disposed above said carrier, an actuating element thereon, and an operative connection between said actuating element and said enlarged portion for reciprocating the punch carrier.

16. In a machine of the class described, in combination, a reciprocable tubular punch, a receptacle for the chips cut by said punch, and means for agitating chips contained within said receptacle.

17. In a machine for forming perforations in sheet material, in combination, a tubular punch, a carrier therefor having a receptacle therein for chips cut by the punch, and means for agitating chips within said receptacle.

18. In a perforating machine having a hollow punch, in combination, a punch-carrier having a hollow punch secured thereto and provided with a cavity adjacent the punch arranged to receive the chips cut thereby, and a reciprocatory chip agitator within said cavity.

19. In a perforating machine, in combination, a punch carrier comprising a stem arranged to be guided for reciprocatory movement, and a part provided with a cavity, said cavity presenting an opening at the extremity of the carrier, a punch holder having a sleeve constructed to enter said cavity, means for retaining said sleeve within said cavity, and a reciprocatory chip agitator within said cavity.

20. In a perforating machine, in combination, a punch carrier provided with a cylindrical cavity which presents an opening at the extremity of said carrier, a punch holder provided with a sleeve constructed to enter said cavity, means for securing said holder within said cavity, and a hollow cylindrical chip agitator slidable within said cavity and having a reduced portion entering within and slidable in said sleeve.

21. In a perforating machine, in combination, a punch carrier having therein a cylindrical cavity opening at its extremity, a punch holder having a sleeve portion engageable within said cavity and means for clamping said sleeve therein, said sleeve being provided with a slot at its inner extremity, a hollow cylindrical chip agitator slidable within said cavity and having a portion of reduced diameter slidable within said sleeve, said reduced portion being provided with a lug engageable with said slot.

22. In a punch device for perforating machines employing a hollow punch, in combination, a punch carrier having a cavity therein opening at the extremity thereof, and provided with a chip delivery opening leading from said cavity, a chip agitator in the form of a sleeve slidable in said cavity and having a chip delivery opening, means for reciprocating said sleeve, and means for registering the chip delivery openings in said sleeve and in the carrier.

23. In a perforating machine, in combination, a punch carrier reciprocable in a vertical plane and provided with a cylindrical cavity opening at its lower extremity and having a chip delivery opening intermediate its ends and leading from said cavity, a punch holder having a sleeve portion extending within said cavity and secured thereto, a hollow cylindrical chip agitator slidable within said sleeve and provided with a chip delivery opening in register with the delivery opening in the carrier, means for reciprocating said agitator, and means for preventing rotary movement of said agitator.

24. In a machine of the class described, a punch carrier, having a punch secured to the extremity thereof, said carrier being provided with a receptacle for chips cut by the punch, and means for momentarily enlarging the capacity of said receptacle as each chip enters the same.

25. In a machine of the class described, in combination, a reciprocable punch carrier having a receptacle therein for chips and with a discharge opening leading from said receptacle, a hollow punch mounted upon said carrier and delivering its chips into said receptacle, means for momentarily enlarging said receptacle as the punch performs its cutting operation, and for diminishing the capacity thereof to normal upon retraction of the punch from the work.

26. In a perforating machine, in combination, a tubular punch carrier, means for guiding and for reciprocating the same, a punch holder mounted upon the lower extremity thereof and provided with a hollow punch, a chip agitator slidable within said carrier and above the punch holder, means normally maintaining said agitator adjacent the lower extremity of said carrier, and means for moving said agitator away from said lower extremity of the carrier just prior to the cutting operation of the punch.

27. In a machine of the class described, in combination, a tubular punch carrier, guiding means therefor, means for reciprocating the carrier, a punch holder having a sleeved portion, said sleeved portion extending into and being secured in the lower extremity of said carrier, a cylindrical chip extractor having a closed upper end slidable in said carrier and having a reduced portion adjacent and engageable within the sleeved portion of the punch holder, a rod having one end secured to the closed upper end of the agitator and extending upward through said carrier, a stop member fixed upon the upper end of said rod and engageable with said guiding means to limit the downward movement of said rod, and a coil spring surrounding said rod and engaging at its opposite ends respectively with said closed upper end of the agitator and an abutment upon the carrier.

28. In a machine employing a reciprocating tool for operating upon sheet material, in combination, means for intermittently feeding said material past said tool, and a presser foot for holding said material in position between the intervals of feeding, said presser foot comprising a pair of spaced arms located on opposite sides of the axis of the tool and extending oppositely to the direction of feed movement, and a material-engaging element of substantially arcuate form carried by said presser foot.

29. In a presser foot device for machines adapted to form rows of perforations in sheet material, in combination, a supporting stem, and a foot portion of substantially U form having its arms arranged to extend substantially parallel to the row of perforations formed in the material, and a rib of arcuate form carried by said presser foot and constituting the material-engaging element of said foot.

30. In a perforating machine having a reciprocable punch, means for imparting a work feeding movement to said punch while the latter is in engagement with the work, and a presser foot for holding the work in position during the intervals of feeding, said presser foot comprising an arcuate, work-engaging rib, the center of curvature thereof being substantially coincident with the axis of the punch when the latter is at its limit of feeding movement.

31. In a perforating machine of the type employing a reciprocating punch, in combination, a vertically adjustable punch-bed or anvil for supporting the work, means for adjusting the working level of the punch-bed or anvil said anvil being removably mounted, devices for feeding a strip of paper over said punch-bed, and means for guiding said strip over the surface of said punch-bed.

32. In a perforating machine having a reciprocatory punch, in combination, devices for feeding a paper strip for receiving the blow of the punch, and a plurality of interchangeable supporting devices for said strip, the several devices having differently arranged guides for said strip whereby the strip may be presented to receive the blows of the punch at a selected predetermined portion of its surface.

33. In a perforating machine, in combination, a base member, a punch supporting bracket fixed thereto and having a vertically reciprocating punch therein, said base member being provided with a guide opening therein in alinement with said punch, means for feeding a paper strip for receiving the blows of the punch and a vertically adjustable member below said opening constructed and arranged to support either of a plurality of interchangeable punch-bed or anvil members respectively provided with differently arranged paper strip guides.

34. In a perforating machine, in combination, a base-member, a punch supporting bracket carried thereby and having a punch guided for vertical reciprocation therein, said base-member being provided with an opening in alinement with the axis of the punch, a lever-member pivoted intermediate its ends to said base-member and having one extremity located beneath said opening for supporting a punch-bed or anvil therein, and having its opposite extremity in contact with an adjusting device.

35. In a perforating machine having a reciprocatory punch, in combination, means for adjustably supporting a punch-bed or anvil, said means comprising a lever member pivoted intermediate its ends having one extremity arranged to support said punch-bed and having a slot in its opposite extremity, an adjusting screw of relatively large diameter bearing upon said lever at its slotted portion, a screw of relatively small diameter passing through said slot and having threaded engagement with an axial opening in said first named screw, and a spiral spring interposed between the head of said second screw and the lever member.

36. In a perforating machine, in combination, a reciprocatory punch, an anvil coöperating therewith and means for moving said anvil in the path of reciprocation of said punch comprising an adjusting screw arranged remotely from and laterally of the anvil relatively to said path, and a positive connection between said adjusting screw and anvil for transmitting adjusting movements from the former to the latter.

37. In a perforating machine, in combination, a reciprocatory punch, an anvil coöperating therewith, and means for supporting said anvil for movement in the path of reciprocation of said punch comprising a lever and a screw of low pitch engaging said lever for adjusting the same.

38. In a perforating machine employing a punch and an anvil and a strip of paper passing between the work and the anvil, in combination, means for controlling the passage of the strip of paper over said anvil comprising a pair of feed rolls, a paper rewinding shaft, and common means independent of the paper strip for driving said rolls and shaft.

39. In a perforating machine having a reciprocatory punch and an anvil coöperating therewith, in combination, means independent of said punch for feeding a strip of paper over the anvil and beneath work to be punched, said means being wholly located in a plane below that of the anvil.

40. In a perforating machine having a reciprocatory punch and an anvil coöperating therewith, and a strip of paper passing between the work and the anvil, in combination, a paper-feeding device comprising an intermittently rotatable drive shaft located in a plane below that of the anvil, a pair of feed rolls driven thereby, a paper rewinding shaft, and connections from said drive shaft for rotating said rewinding shaft.

41. In a mechanism for producing reciprocating motion, in combination, a rotary shaft, a pair of complemental cam elements located upon the same side of the shaft, and a pair of operably connected cam followers located upon opposite sides of said shaft and engageable with the respective cam elements.

42. In a mechanism for producing reciprocating motion, in combination, a rotary shaft, a pair of complemental non-positive cam members located side by side thereon and having their active portions upon the same side of the shaft, and operably connected cam followers located upon opposite sides of the shaft and engageable with the respective cams.

43. In a mechanism for producing reciprocating motion, in combination, a rotary shaft, a pair of cams fixed thereon having complemental, open cam elements on the same side of the shaft, an oscillatory member having a cam follower thereon engageable with one of said cam elements and at one side of the shaft, and a second member adjustably connected to said oscillatory member and having a second cam follower engageable with the other of said cam elements and upon the diametrically opposite side of the shaft from said first cam follower.

44. In a perforating machine having a punch, an anvil and a strip of paper passed between said punch and anvil, in combination a supporting bracket, an arm pivoted thereto to swing in a horizontal plane, and a pivot member carried by said arm constructed and arranged to support a paper supply holder for rotation in a horizontal plane.

In testimony whereof, I have signed my name to this specification.

DONALD NOBLE.